(12) United States Patent
Bandou et al.

(10) Patent No.: US 6,612,823 B2
(45) Date of Patent: Sep. 2, 2003

(54) COTTON CANDY MAKING MACHINE

(75) Inventors: Tadanori Bandou, Hokkaido (JP); Koichiro Handa, Hokkaido (JP)

(73) Assignee: Handa Kikaikigu Co., Ltd., Nokkaido (JP)

( * ) Notice: Subject to any disclaimer, the term of this patent is extended or adjusted under 35 U.S.C. 154(b) by 129 days.

(21) Appl. No.: 09/847,262

(22) Filed: May 2, 2001

(65) Prior Publication Data

US 2001/0041195 A1 Nov. 15, 2001

(30) Foreign Application Priority Data

| May 11, 2000 | (JP) | ................................... | 2000-138719 |
| Sep. 14, 2000 | (JP) | ................................... | 2000-280606 |
| Nov. 1, 2000 | (JP) | ................................... | 2000-334865 |

(51) Int. Cl.[7] .............................. B29C 67/02; A23G 7/00
(52) U.S. Cl. ............................................. 425/9; 264/8
(58) Field of Search ............................... 425/8, 9; 264/8

(56) References Cited

U.S. PATENT DOCUMENTS

| 3,203,365 A | * | 8/1965 | Bowe et al. ..................... 425/9 |
| 3,279,394 A | * | 10/1966 | Bowe .............................. 425/9 |
| 3,856,443 A | * | 12/1974 | Salvi ............................... 425/9 |
| 3,930,043 A | * | 12/1975 | Warning et al. ............. 426/515 |
| 4,360,328 A | * | 11/1982 | Kassabian ....................... 425/9 |
| 5,145,687 A | * | 9/1992 | Parker ............................ 425/9 |
| 5,511,961 A | * | 4/1996 | Sullivan ......................... 425/9 |

FOREIGN PATENT DOCUMENTS

| JP | A-57-64885 | 4/1982 |
| JP | A-63-164849 | 7/1988 |
| JP | A-6-343394 | 12/1994 |
| JP | U 3050426 | 4/1998 |

\* cited by examiner

*Primary Examiner*—Robert Davis
*Assistant Examiner*—Joseph S. Del Sole

(57) ABSTRACT

A cotton candy making machine has a rotary pot having a rotation axis associated with a driving means, where a heater is included to heat sugar provided as a raw material and release the heated sugar in the form of floss-like threaded sugar from the rotary pot to the outside by rotating the rotary pot around the rotation axis by a rotary motion of the driving means; a basin to be rotated together with the rotary pot, in which the rotary pot is concentrically arranged; a raw material supplying means for supplying the sugar into the rotary pot; and a floss taking-up means that rotates around its rotation axis in a predetermined direction to take up floss-like threaded sugar released from the rotary pot. The rotation axis of the rotary pot and the rotation axis of the floss taking-up means form an intersection with each other at a predetermined angle.

12 Claims, 24 Drawing Sheets

FROM THE HOPPER 24c

TO THE NOZZLE 29c
(DISTRIBUTION IN A
REGULATED AMOUNT)

TO THE TAKEOFF

COTTON CANDY MAKING MACHINE

BACKGROUND OF THE INVENTION

1. Field of the Invention

The present invention relates to a cotton candy making machine for making a light and very sweet candy of threaded sugar generally named as cotton candy, spun candy, or candy floss.

2. Description of Related Art

Heretofore, machines for making cotton candies have been generally known in the world. In addition, there are various types of cotton candy making machines on the market, such as a hand-operating type cotton candy making machine to be used at a temporary store at a festival and an automatically-operated cotton candy vending machine to be provided as a permanent machine at a store. The conventional automatic cotton candy vending machine (hereinafter, also simply referred to as a cotton candy making machine), for example, comprises a means for supplying granular sugar as a raw material, a rotary pot that ejects floss-like threaded sugar therefrom by heating the predetermined amount of the raw material supplied from the sugar-supplying means, and a means for positioning a floss taking-up stick (hereinafter, also simply referred to as a stick) on which floss-like threaded sugar is wound. In general, the rotary pot is coaxially placed on the inside of the basin and their openings are directed upward, so that they are supported and rotated by any devices provided below their backs. In this case, the raw material (i.e., granular sugar) is supplied into the inside of the rotary pot through a chute from above.

In such a configuration of the conventional machine, however, there is a problem that much expense in time and effort is required for maintenance. During a rotary motion of the rotary pot, a part of the raw material melted by heat flies out of the rotary pot and the inner surface of the basin is spoiled by the adhesion of such a material.

Several solutions to this problem have been proposed. As disclosed in Japanese Patent Application Laying-open No. 6-343394 (1991), one such solution is to provide a cotton candy making machine in which a rotary pot is suspended from overhead for supplying a raw material into a rotary pot through a hanging device to prevent the fly-off of the raw material.

FIG. 27 is a schematic diagram for illustrating a general configuration of the cotton candy making machine disclosed in Japanese Patent Application Laying-open No. 6-343394 (1991). In the figure, the reference numeral 151 denotes a rotary pot with an internal heater, 152 denotes a support tube that supports and allows a rotary motion of the rotary pot 151, 153 denotes a driving motor for rotating the rotary pot 151 together with the support tube 152, 154 denotes a sugar storage tank that stores a raw material (i.e., granular sugar) to be fed to the rotary pot 151, and 155 denotes a chute that is provided as a feed channel between the sugar storage tank 154 and the support tube 152, 156 denotes a basin that surrounds the rotary pot 151, 160 denotes a container for reserving and supplying sticks 161 to be used for taking up floss-like threaded sugar to be provided as a cotton candy, 162 denotes a holder having a chuck 163 for holding a floss taking-up stick 161, and 170 denotes a bag container that reserves bags 171 for packaging the resulting cotton candy.

Now, we will describe the working of the conventional cotton candy making machine constructed as above in detail.

At first, the cotton candy making machine is brought into operation when a control unit (not shown) receives an operator's instruction through a switch panel or the like (not shown). That is, the instruction permits the commencement of the process for making cotton candy. Then, the control means allows that a predetermined amount of sugar is supplied to the rotary pot 151 from the sugar storage tank 154 through the chute 155 and the support tube 152. The granular sugar is heated by the internal heater (not shown) in the rotary pot 151 to release floss-like threaded sugar from a plurality of pores formed on the peripheral surface of the rotary pot 151. On the other hand, the basin 156 and the rotary pot 151 are concentrically positioned and constructed so that they rotate together.

Then, one of the sticks is forced out of the stick storage tank 160 by a supplying device (not shown) and held by the chuck 163 provided on the lower end of the stick holder 162. The chuck 163 is able to turn 90° from the rightward direction to the downward direction. The stick holder 162 is able to shift its position in the vertical and horizontal directions.

A moving device 164 moves the stick 161 from the stick storage tank 160 to a predetermined position where the stick 161 is rotated by a rotary motion of the stick holder 160 for winding the floss-like threaded sugar onto the stick 161.

If a cotton candy is formed by taking up the predetermined amount of floss-like threaded sugar on the stick 161, the stick 161 is further moved downward. On that occasion, a bag is pulled out of the bag storage tank 170 on a one-by-one basis for packing the cotton candy in the bag.

As the cotton candy making machine disclosed in the Japanese Patent Application Laying-open No. 6-343394 (1994) is constructed as described above, it is possible to prevent the undesired release of sugar from the rotary pot to the outside when the granular sugar is supplied into the rotary pot 151.

In spite of such an advantage, the conventional cotton candy making machine described above has the following problems to be solved.

First, there is the problem in a maintainability of the cotton candy making machine. That is, floss-like threaded sugar released from the rotary pot may adhere on the internal wall of the basin or the like when it is not wound onto the stick. Therefore, the cleaning of the internal wall of the basin or the like takes a great deal of time after running the cotton candy making machine each time.

Second, there is the problem in the shape of a resulting cotton candy. In the conventional cotton candy making machine, as shown in FIG. 28, floss-like threaded sugar is released from the rotary pot 151 and concurrently a blast of hot air (indicated by the arrow C in the figure) blows in the direction of the radius of the rotary pot 151. In this case, however, the stick 161 is placed in parallel to a peripheral surface (or a rotation axis) of the rotary pot 151, so that the shape of the growing cotton candy twirling round the stick may be affected by the blowing hot air. In other words, there are two different portions on the cotton candy 100. That is, one portion of the cotton candy 100 is deformed by receiving a current of the blowing hot air C and the other portion is freed from the flow of hot air C. As a consequence, the blast of hot air C makes an irregularly shaped surface of the cotton candy 100.

Third, there is the problem in the safety of a resulting cotton candy product, especially the safety of a floss taking-up stick. Conventionally, the floss-taking up stick is provided as a hard stick made of wood or plastic material. In Japan, there was an accident that took the life of a little boy by such a wooden stick. The stick reached to his brain stem when he fell down on the ground. Therefore, there is a need to improve a material or a structure of the stick for providing a cotton candy product with complete safety.

SUMMARY OF THE INVENTION

The present invention is implemented to solve the foregoing problems. It is therefore an object of the present invention is to provide a cotton candy making machine that allows the production of a cotton candy in a preferable shape.

Another object of the present invention is to provide a cotton candy making machine that can be easily kept in proper condition. Especially, a basin of the cotton candy making machine can be kept from being spoiled.

Still another object of the present invention is to provide a cotton candy making machine that allows a cotton candy product to be eaten with complete safety.

Here, a cotton candy making machine of the present invention, comprises: a rotary pot having a rotation axis associated with a driving means, where a heater is included to heat sugar provided as a raw material and to release the heated sugar in the form of floss-like threaded sugar from the rotary pot to the outside by rotating the rotary-pot around the rotation axis by a rotary motion of the driving means; a basin to be rotated together with the rotary pot, in which the rotary pot is concentrically arranged; a raw material supplying means for supplying the sugar into the rotary pot; and a floss taking-up means that rotates around its rotation axis in a predetermined direction to take up floss-like threaded sugar released from the rotary pot, wherein the rotation axis of the rotary pot and the rotation axis of the floss taking-up means form an intersection with each other at a predetermined angle.

The floss taking-up means may comprise: a floss taking-up stick made of paper onto which floss-like threaded sugar released from the rotary pot is wound; and a stick holding means for holding the stick, which is able to rotate around an axis thereof for twirling the floss-like threaded sugar onto the stick.

The floss taking-up means may comprise: a floss taking-up stick onto which floss-like threaded sugar released from the rotary pot is wound; and at least one leaf spring provided around a peripheral surface of the stick, and the machine may further comprise: a cotton candy detaching means for taking the floss-like threaded sugar out of the stick; and a container-supplying means for supplying a predetermined container in which the detached floss-like threaded sugar to provided it as a cotton candy.

The cotton candy detaching means may comprise: an extruding means having an opening through which a floss taking-up stick is passed, where the extruding means is able to move in the direction along a rotation axis of the floss taking-up stick, and the leaf spring is pressed toward the rotation axis of the floss taking-up stick by the opening of the extruding means as the extruding means is moved.

The cotton candy making machine may further comprise a plurality of cotton candy supporting plates which are arranged on the tip of the floss taking-up stick so as to be radially opened in the direction of the radius of the floss taking-up stick, where the cotton candy, supporting plates are radially opened in the radial direction when the extruding means is positioned on the side of the rear end of the floss taking-up stick, while the cotton candy supporting plates are converged as the extruding means moves to the tip of the floss taking-up stick.

The cotton candy making machine may further comprise: a sheet of removable soil-preventing paper that covers both the bottom and the inner peripheral surface of the basin; and a fixing means for holding down the soil-preventing paper on the basin.

The basin may be at least constructed of: a framework; a sheet of removable soil-preventing paper to be provided as at least an inner peripheral surface of the basin; and a fixing means for fixing the soil-preventing paper on the framework.

The raw material supplying means may be constructed of a plurality of hoppers communicated with the rotary pot through metering distributors.

Alternatively, the stick provided as a floss taking-up means may be constructed as a raw material supplying means in which a predetermined amount of sugar is contained, and thus the cotton candy making machine may further comprise a means for charging the sugar into the rotary pot by opening one end of the sugar-containing stick.

The above and other objects, effects, features, and advantages of the present invention will become more apparent from the following description of embodiments thereof taken in conjunction with the accompanying drawings.

DETAILED DESCRIPTION OF PREFERRED EMBODIMENTS

The invention will now be described with reference to the accompanying drawings.

Embodiment 1

Figure 1:
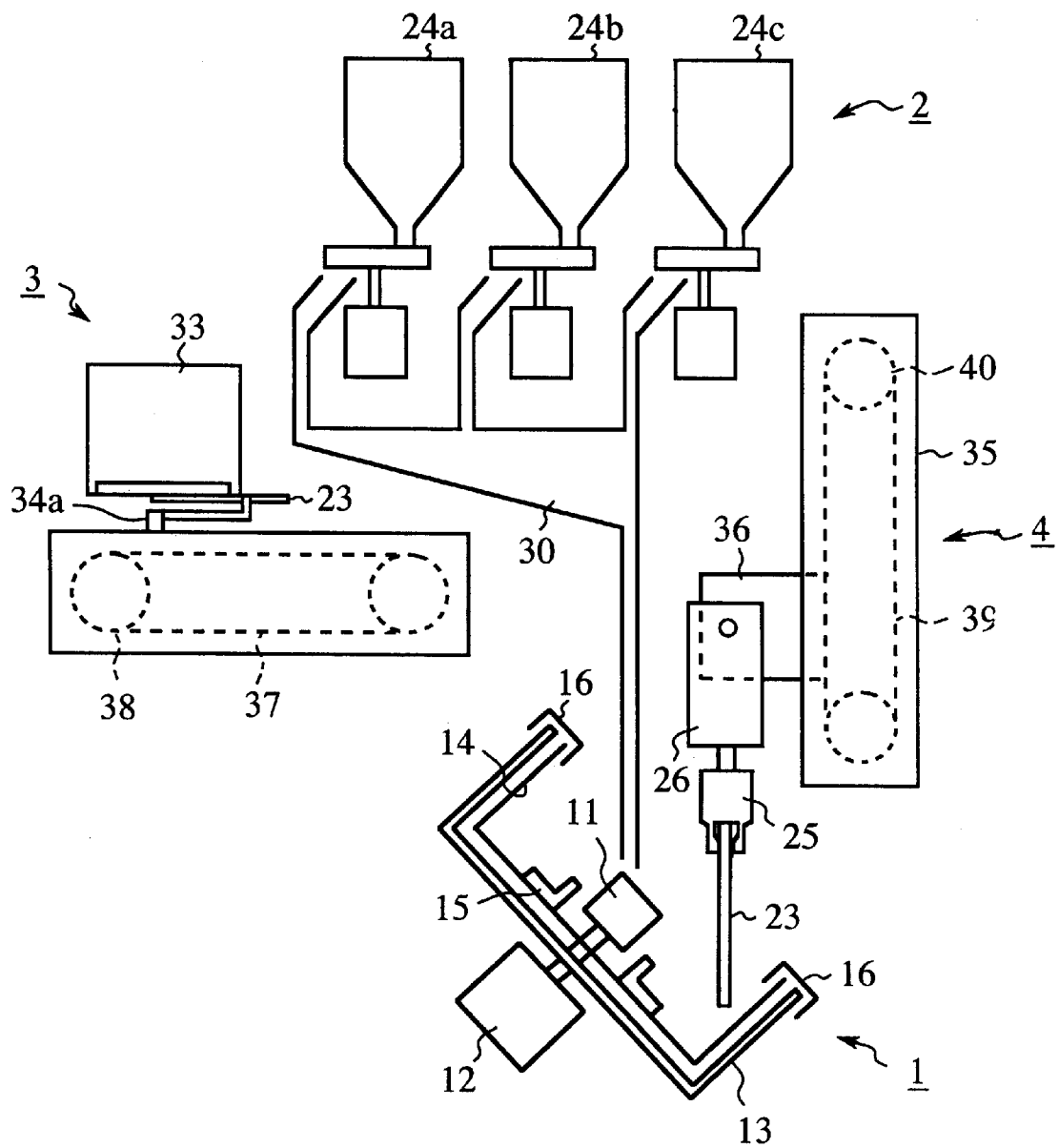
FIG. 1 is a schematic diagram that illustrates a general configuration of a cotton candy making machine as a first embodiment of the present invention.

FIG. 1 is a schematic diagram that illustrates a general configuration of a cotton candy making machine in accordance with a first embodiment (Embodiment 1) of the present invention. In the figure, the reference numeral 1 denotes a cotton candy making section, 2 denotes a raw material supplying section for supplying a raw material (i.e., granular sugar) to the cotton candy making section 1, 3 denotes a stick supplying section for reserving floss taking-up sticks and supplying each stick for twirling threaded sugar thereon, and 4 denotes a stick up-down section for moving the stick supplied from the stick supplying section to the cotton candy making section 1. The movements of these structural components are coordinated with each other under the control of a control section (not shown).

Figure 2:
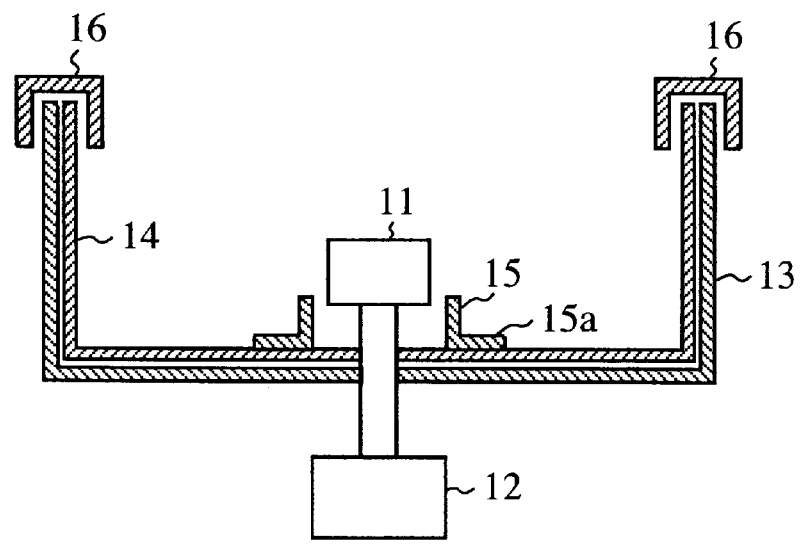
FIG. 2 is a schematic diagram of an example of the cotton candy making section shown in FIG. 1.

FIG. 2 is a schematic diagram of an example of the cotton candy making section shown in FIG. 1. In the figure, the reference numeral 11 denotes a rotary pot that includes an internal heater, 12 denotes a driving motor that imparts a rotation motion to the rotary pot 11, 13 denotes a basin in which the rotary pot 11 is concentrically positioned, 14 denotes a sheet of soil-preventing paper that removably covers the bottom and inner peripheral surfaces of the basin 13, and 15 denotes a fixing cylinder (a paperweight) that is placed on loose paper 14 to hold it down. The fixing cylinder 15 has a skirt 15a as an outer edge that lies along its bottom end and extends outward in the direction of the radius thereof. Furthermore, the reference numeral 16 denotes a stopper (a one-touch clamp mechanism) for holding the edge of soil-preventing paper 14 and the edge of the basin 13 together.

Figure 3:
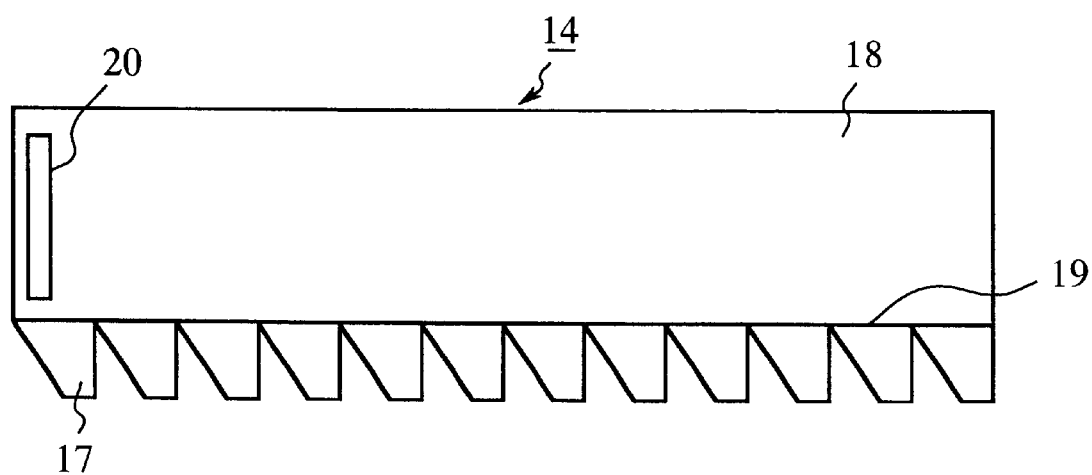
FIG. 3 is a plan diagram that illustrates an example of soil-preventing paper for covering the bottom and inner peripheral surfaces of the basin of the cotton candy making machine in accordance with the present invention.
Figure 4:
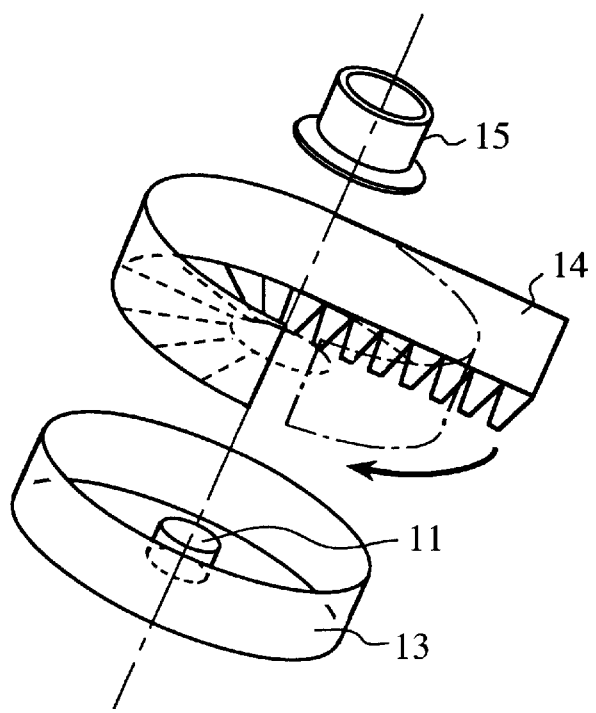
FIG. 4 is a schematic perspective diagram that illustrates the way of placing the paper shown in FIG. 3 in a basin of the cotton candy making machine in accordance with the present invention.

FIGS. 3 and 4 are provided for illustrating an example of soil-preventing paper 14 for covering the bottom and inner peripheral surfaces of the basin 13 of the cotton candy making machine in accordance with the present embodiment. FIG. 3 is a plan diagram that illustrates the soil-preventing paper and FIG. 4 is a schematic perspective diagram that illustrates the paper shown in FIG. 3 to be arranged in the basin 13. In the figures, the reference numeral 14 denotes a sheet of the soil-preventing paper, 17 denotes a sawtooth part of the paper 14, 18 denotes a rectangular part of the paper 14, 19 denotes a boundary part of the paper 14, and 20 denotes a double-faced tape on the paper 14.

Referring to FIGS. 3 and 4, we will describe the soil-preventing paper 14 in detail. The paper 14 is prepared from a rectangular-shaped paper. That is, the paper 14 comprises a sawtooth part 17 formed by cutting the side of one longitudinal end of the rectangular-shaped paper into a sawtooth-like shape, a rectangular part 18 adjacent to the sawtooth part 17, and a boundary part as a boundary between the sawtooth part 17 and the rectangular part 18.

For applying the soil-preventing paper 14 on the basin 13, the paper 14 is inwardly folded along the boundary part 19 and then the both ends of the rectangular part 18 are fixed together by the double-faced tape 20 or the like to shape the paper in a basin form. The double-faced tape 20 may be attached on one end portion of the rectangular part 18 in advance.

The tip of the sawtooth part 17 is truncated so as to form an opening portion at a center of the bottom of the paper basin formed by folding the paper 14. The diameter of the opening is larger than that of the rotary pot 11. The size and the shape of each part of the soil-preventing paper 14 may be defined in consideration of the sizes and the shapes of the prime constituents of the cotton candy making machine.

Figure 5:
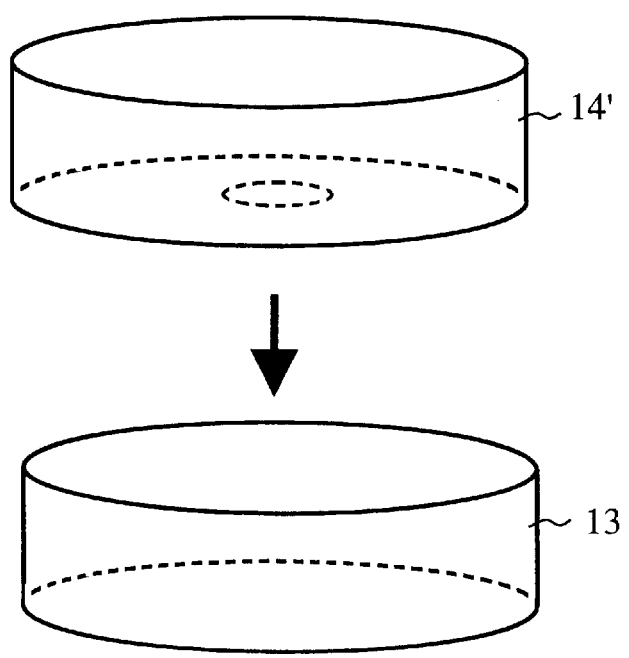
FIG. 5 is a perspective diagram that illustrates another example of soil-preventing paper to be applied in the cotton candy making machine of the present invention.

The basin-shaped paper 14 is placed in the basin 13. On that occasion, there is a possibility that the paper 14 is improperly placed in the basin 13 because any part of the paper 14, especially the sawtooth part 17 thereof suffers some warping. For preventing such an improper placement, the fixing cylinder 15 is concentrically put over the rotary pot 11 with a gap such that the skirt portion 15a is placed on the paper 14 to hold it down. While the edge of the soil-preventing paper 14 is fixed on the edge of the basin 13 using the stopper 16, for example a clip or a one-touch clamp mechanism being attached on the edge of the basin 13 in advance. It is noted that the soil-preventing paper 14 is not limited to one shown in FIG. 3. The paper 14 may be formed into any shape. As shown in FIG. 5, for example, a paper basin 14' may be used. The paper basin 14 is prepared from a sheet of soil-preventing paper by folding it like a basin before it is supplied to the user. In this case, several sheets of the soil-preventing paper (the paper basins) 14' are stacked on top of each other in layers in the inside of the basin 13 in advance and then they can be taken off one after the other every time the cotton candy making machine is brought into operation.

Figure 6:
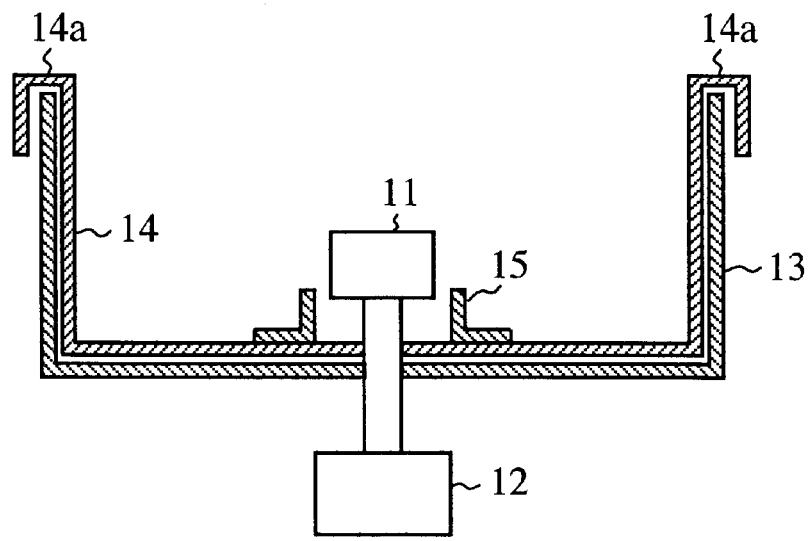
FIG. 6 is a perspective diagram that illustrates an example of basin to be applied in the cotton candy making machine of the present invention.

The shapes of the soil-preventing paper 14 and 14' are not limited to those described above. It is needless to say that it is possible to provide the soil-preventing paper 14 and 14' in various forms for easily removing the paper from the basin 13, keeping the basin 13 from being soiled, or the like. As shown in FIG. 6, for example, folding portions (e.g., several protruded portions) 14a may be formed on the edge of the soil-preventing paper 14 (or 14'). In this case, these portions are outwardly folded such that it hangs on the edge of the basin 13. In addition, as shown in FIG. 2, the stopper 16 may be put over the folded portion 14a. The folded portions 14a of the soil-preventing paper 14 may be raised and picked to easily remove the soil-preventing paper 14 from the basin 13.

Figure 7:
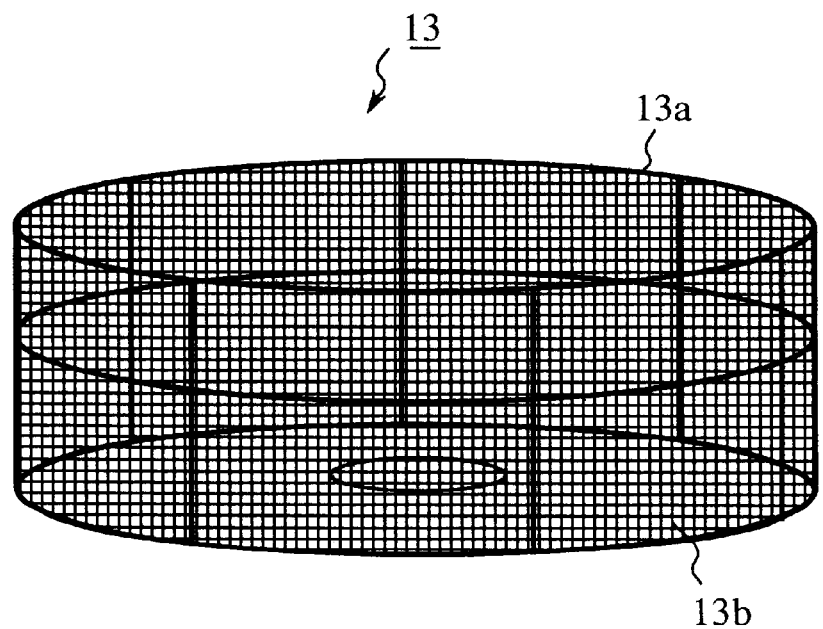
FIG. 7 is a schematic cross sectional diagram that illustrates an example of soil-preventing paper having folded portions applied on a basin of the cotton candy making machine in accordance with the present invention.

According to the present embodiment, the basin 13 of the cotton candy making machine may be made of aluminum just as in the case with that of the conventional one. For more easily removing the soil-preventing paper 14 or 14', as shown in FIG. 7, the basin 13 may be prepared as a simplified basin constructed of a stainless steel net 13b placed around a framework 13a to keep the paper 14 or 14' from being adhered to the surface of the basin 13. Alternatively, further more, the basin 13 may be only constructed of the framework 13a if the paper basin 14' is used.

Accordingly, the cotton candy making machine can be used repeatedly at no expense in time and effort to clean the basin or the like and also there is no need to place a sheet of the soil-preventing paper on the basin after each use because two or more sheets of soil-preventing paper 14 or 14' are stacked on the surface of the simplified basin in advance. The outermost sheet of the paper 14 or 14' is removed after using the cotton candy making machine.

Furthermore, another type of soil-preventing paper such as a continuous roll of paper may be used instead of the above paper 14 or 14'.

Figure 8A:
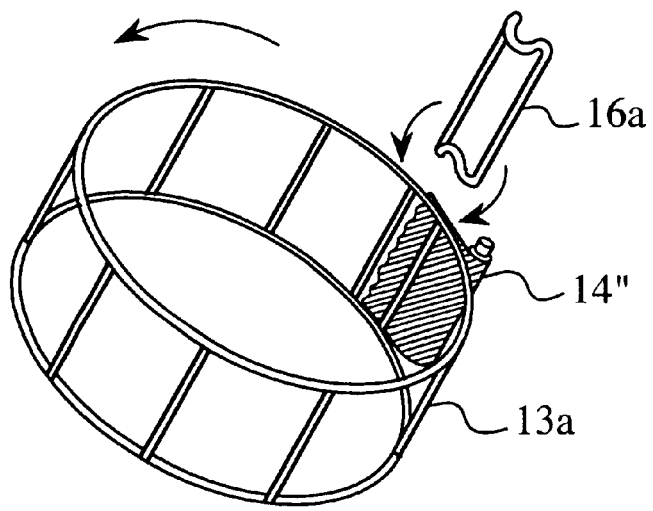
FIG. 8A is a perspective diagram that illustrates a framework of basin and a continuous roll of soil-preventing paper to be used in the cotton candy making machine in accordance with the present invention.
Figure 8B:
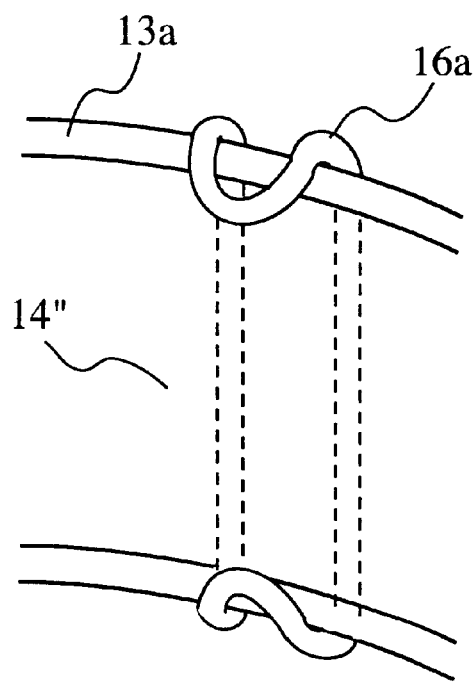
FIG. 8B is a perspective diagram that illustrates a fixing means for fixing the framework and the paper shown in FIG. 8A together.

FIG. 8A and FIG. 8B are perspective diagrams for illustrating an example of the continuous roll of paper to be used in the cotton candy making machine in accordance with the present embodiment. As shown in FIG. 8A, the continuous roll of paper 14" may be perforated between predetermined lengths such that the paper 14" is placed around the cylindrical-shaped framework 13a of the basin 13 and appropriately torn off at the perforated portion. Then the paper 14" being placed around the basin 13 is fixed on the framework 13a by a stopper 16a. In the figure, the paper 14" is fixed by only one stopper 16a. However the invention is not limited in this respect. It is noted that the paper 14" may be fixed by two or more stoppers 16a to prevent the paper 14" being accidentally detached from the framework 13a. In addition, as shown in FIG. 8B, the stopper 16a may be a metal clip having hook-shaped ends or a rectangular rubber member having both ends with metal hooks. In each case, these hooks are hanged on horizontally opposite ends of the framework 13a to fix the soil-preventing paper 14" on the framework 13. Therefore, a continuous roll of the paper for keeping the basin soiled allows the reduction in the space to be required to keep the soil-preventing paper in storage and also allows that the soil-preventing paper is placed around the framework 13a with facility in the shortest possible time. For producing the effects of design, it is also possible to provide a design such as the leading character of a popular animation on the surface of the soil-preventing paper 14".

Figure 9A:
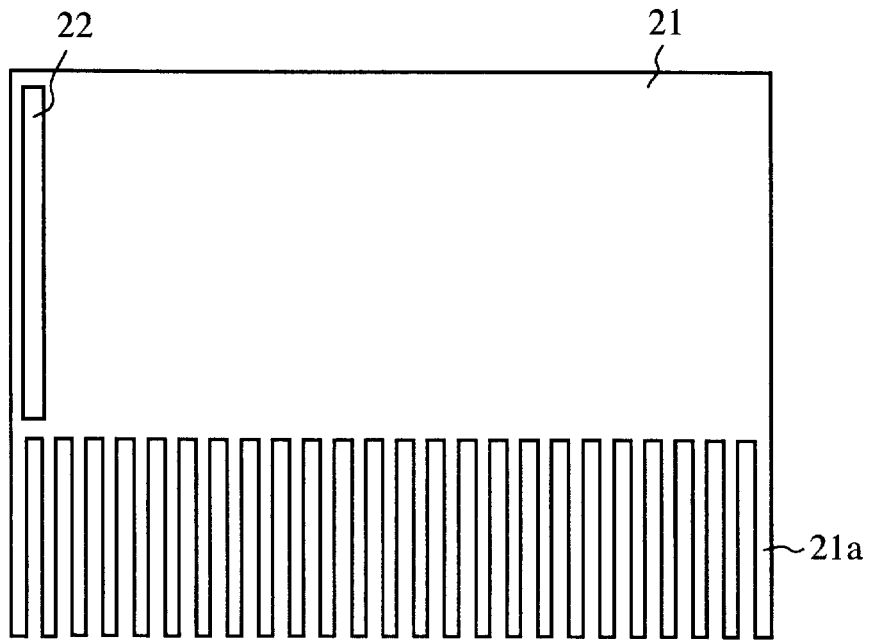
FIG. 9A is a plan diagram of a sheet of paper to be used as a floss taking-up stick to be applied in the cotton candy making machine of the first embodiment of the present invention.
Figure 9B:
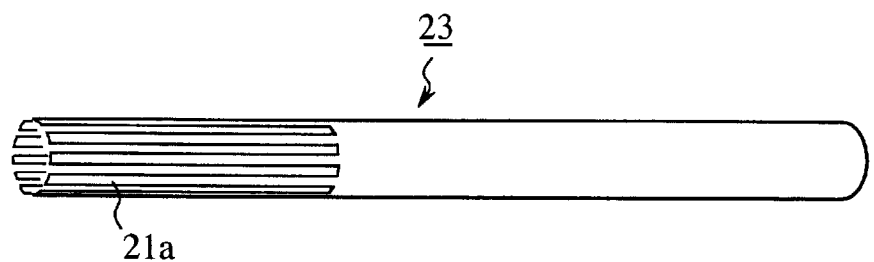
FIG. 9B is a perspective diagram that illustrates a floss taking-up stick formed by rolling up the paper shown in FIG. 9A.
Figure 9C:
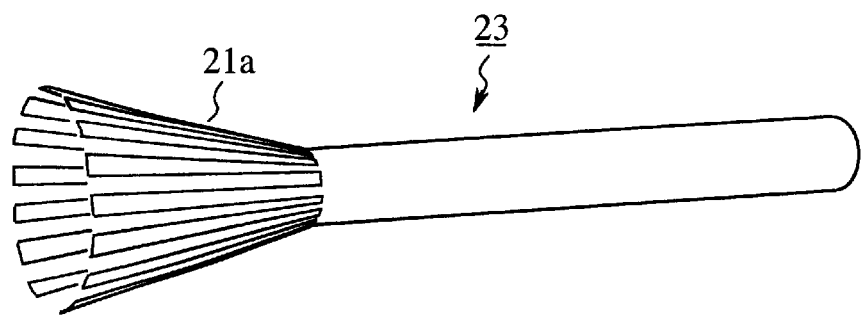
FIG. 9C is a perspective diagram that illustrates the paper stick shown in FIG. 9B, where a slit portion of the stick is opened to outwardly extend a plurality of strips.

Referring now to FIGS. 9A to 9C, an example of the floss taking-up stick to be used in the present embodiment will be described bellow. In the figure, the reference numeral 21 denotes a sheet of paper in square shape to be provided as a paper stick for taking up a cotton candy, 22 denotes an area for sticking with an adhesive material, such as glue or tape, and 23 denotes a floss taking-up stick 23 (hereinafter, also simply referred to as a stick) formed by rolling up a sheet of the paper 21. As shown in FIG. 9A, the floss taking-up stick 23 is constructed of the square-shaped paper having one longitudinal end which is cut crosswise into slits in parallel with each other to provide a slit portion 21a. As shown in FIG. 9B, such a sheet of the paper 21 is rounded up and pasted at the sticking area 22 to make a hollow stick 23 for taking up the cotton candy. The sticking area 22 may be provided with a double faced tape or the like. Thus, the floss-like threaded sugar can be wound onto the slit portion 21a. The slit portion 21a is constructed as described above, so that it is provided with cushioning against the press along the axial direction of the stick 23. Compared to a conventional example, this arrangement minimizes the possibility of an accident in which the stick sticks in the throat of an infant when he or she falls to the ground. Furthermore, as shown in FIG. 9C, the slit portion 21a of the stick 23 may be opened to extend a plurality of strips outwardly for offering a superior level of safety.

Figure 10:
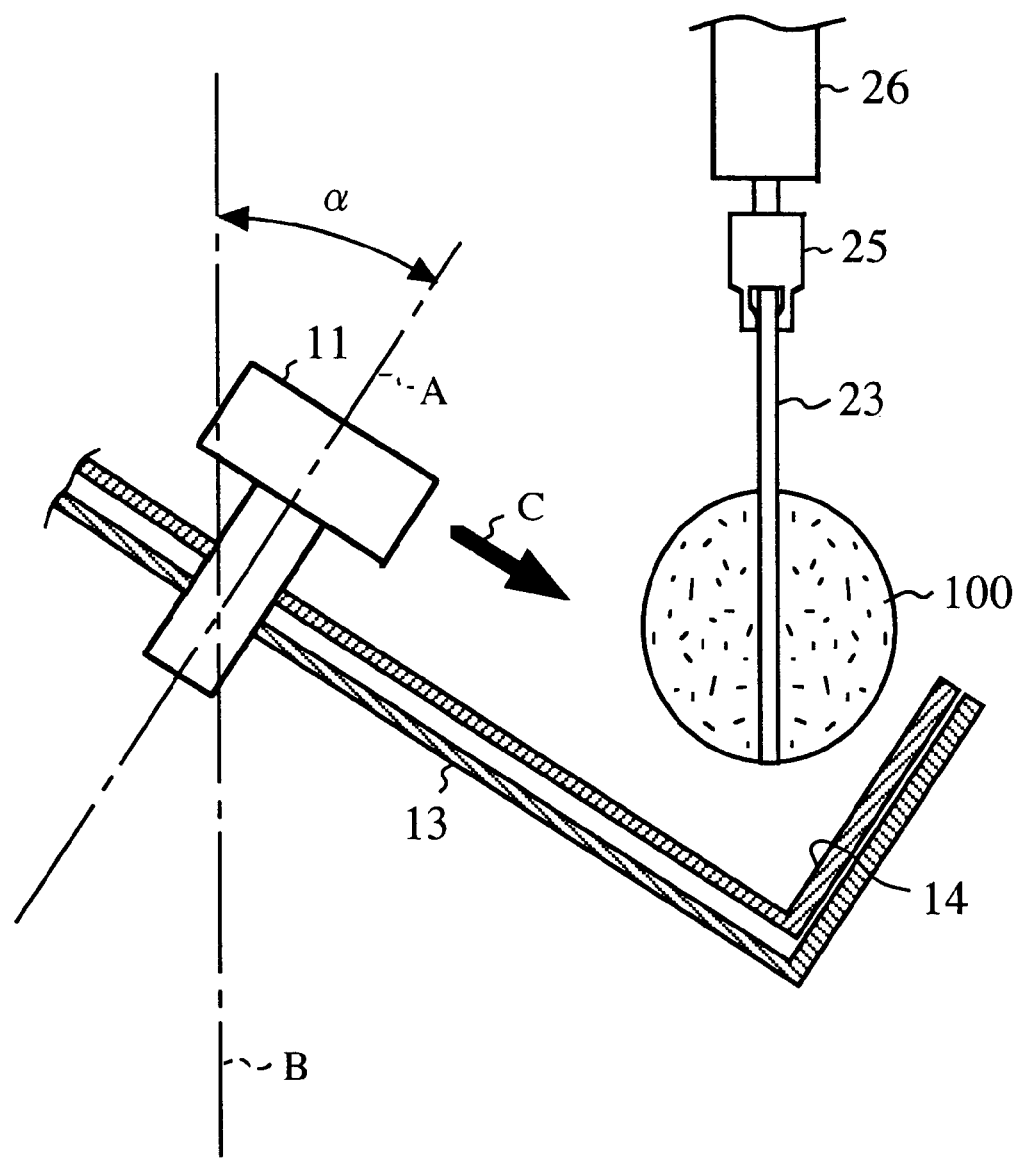
FIG. 10 is a schematic cross sectional diagram that illustrates a cotton candy making section to be applied in the cotton candy making machine in accordance with the first embodiment of the present invention, where a rotation axis of the rotating pod is tilted at a predetermined angle with respect to the vertically oriented stick.
Figure 11A:
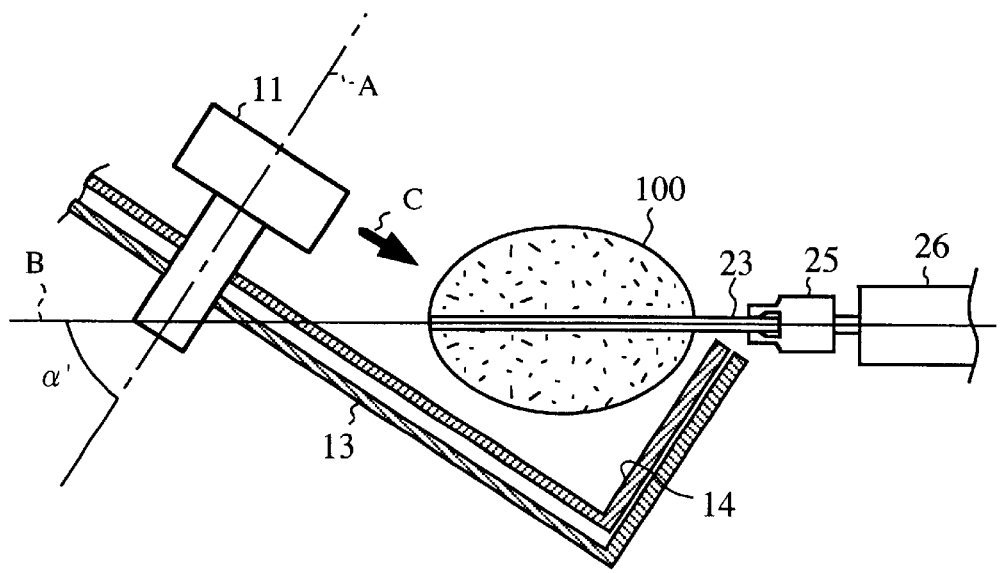
FIG. 11A is a schematic cross sectional diagram that illustrates a cotton candy making section to be applied in the cotton candy making machine in accordance with the first embodiment of the present invention, where a rotation axis of the rotating pod is tilted at a predetermined angle with respect to the horizontally oriented stick.
Figure 11B:
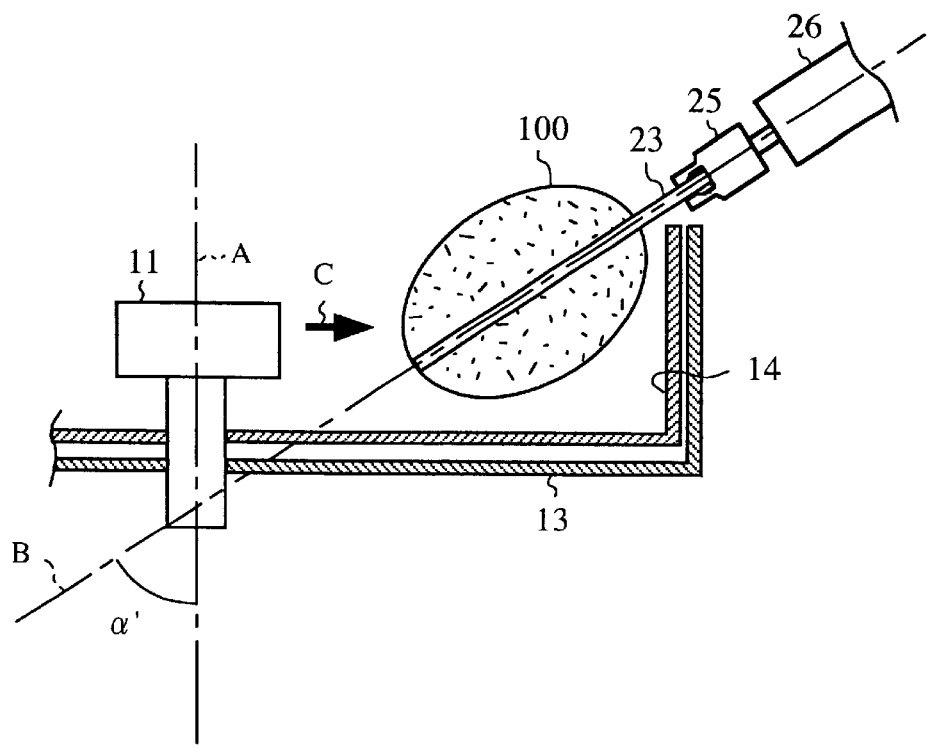
FIG. 11B is a schematic cross sectional diagram that illustrates a cotton candy making section to be applied in the cotton candy making machine in accordance with the first embodiment of the present invention, where a rotation axis of the stick is tilted at a predetermined angle with respect to a vertically oriented rotation axis of the rotating pod.

FIG. 10, FIG. 11A, and FIG. 11B are schematic diagrams that illustrate the relationship among the floss taking-up stick 23, the rotary pot 11, and the basin 13 with respect to their relative positions. In the figures, the reference numeral 11 denotes a rotating port, 13 denotes a basin, 14 denotes a soil-preventing paper, 23 denotes a floss taking-up stick, 25 denotes a holder for holding the floss taking-up stick 23, 26 denotes a chuck for holding one end of the stick 23, which is able to rotate by a motor (not shown) included in the holder 25, and the reference numeral 100 denotes a cotton candy. In the figure, the letter "A" denotes a line parallel to a rotation axis of the floss taking-up stick 23 (hereinafter, the line is simply referred to as a rotation axis of the floss taking-up stick 23). Also, the letter "C" denotes a blast of air blown from the rotary pot 11. In the first embodiment, therefore, the means for taking up the cotton candy is constructed of the stick 23 for taking up floss-like threaded sugar released from the rotary pot 11 and a means for holding the stick 23 in a rotatable manner (e.g., a holder 26 having a chuck 25 for holding the stick 23).

If the rotation axis A of the rotary pot 11 is tilted at a predetermined angle α with respect to the perpendicular (line B), as shown in FIG. 1 and FIG. 10, the stick 23 is arranged vertically so that one end thereof is held in the chuck 25 and the other end thereof extends in a downward direction. Alternatively, the stick 23 may be arranged horizontally as shown in FIG. 11A. If the rotation axis A of the rotary pot 11 is in the horizontal direction, on the other hand, the stick 23 may be arranged such that a line B parallel to the rotation axis of the stick 23 is slanted at a predetermined angle a' with respect to the rotation axis A of the rotary pot 11. In any of these instances, it is very important that the rotation axis B of the floss taking-up stick 23 and the rotation axis A of the rotary pot 11 are arranged at a predetermined angle with respect to each other for the purpose of preventing the deformation of the cotton candy 100 by a blast of air C from the rotary pot 11 during manufacturing.

As shown in FIG. 10 or FIG. 11A, the tilt angle α (or a') of the rotation axis A of the rotary pot 11 with respect to the rotation axis B of the stick 23 is in the range of about 40 to 50 degrees. In this embodiment, the tilt angle α (or α') is about 45 degrees. Such a tilt angle α (or α') is not restricted to such a range but it should be defined appropriately from the view point of preventing the deformation of a cotton candy 100 by a blast of air C from the rotation pot 11 during the process of manufacturing the cotton candy.

The cotton candy making machine may further comprise, but not shown in the figure, a means for adjusting the tilt angle α (or α') of the rotation axis A of the rotary pot 11 while observing the actual formation of a cotton candy 100. Alternatively, the cotton candy making machine may further comprise a means for adjusting the tilt angle of the rotation axis B of the floss taking-up stick 23 while observing the actual formation of a cotton candy 100.

Figure 12A:
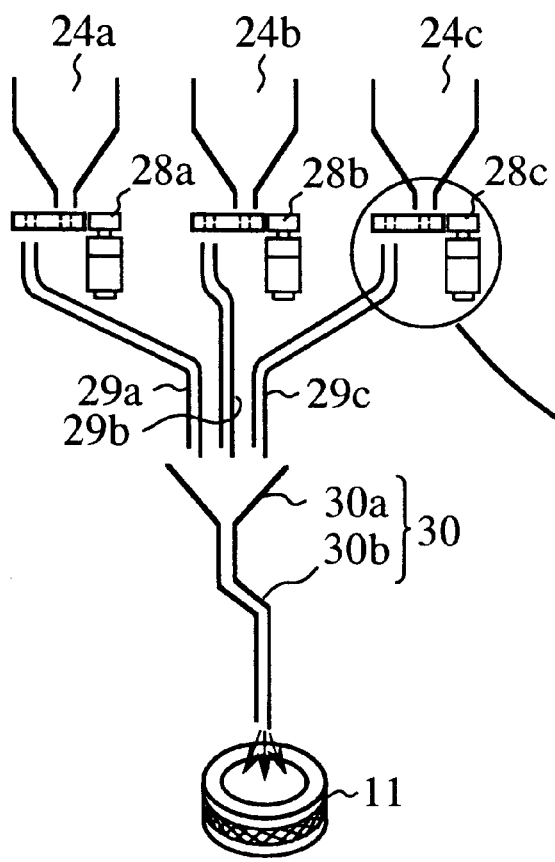
FIG. 12A is a schematic diagram that illustrates a general configuration of a raw material supplying section as a means for supplying a raw material to the rotary pot in the cotton candy making machine in accordance with the first embodiment of the present invention.
Figure 12B:
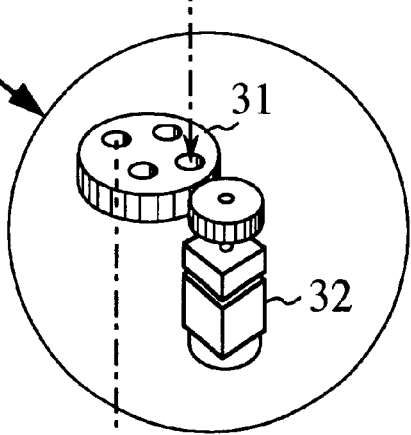
FIG. 12B is an enlarged perspective diagram that illustrates a part of the raw material supplying section shown in FIG. 12A.

Referring now to FIG. 12A and FIG. 12B, we will describe a general configuration of a raw material supplying section 2 as a means for supplying a raw material to the rotary pot 11. In these figures, FIG. 12A illustrates the whole configuration of the raw material supplying section 2 and FIG. 12B is a schematic enlarged view of a part of the raw material supplying section 2 shown in FIG. 12A. In these figures, the reference numerals 24a to 24c denote hoppers that store granular sugar as the raw material of cotton candy. In this embodiment, there are three hoppers in which different colored sugar may be stored respectively or with different flavors. The reference numerals 28a to 28c denote metering distributors, where each of them comprises a disc 31 and a driving motor 32 that imparts a rotation motion of the disc 31. In this embodiment, the disc 31 has four different sized pores. In addition, the reference numerals 29a to 29c denote nozzles that extend in the vertical direction and communicate with their respective hoppers 24a to 24c through the corresponding metering distributors 28a to 28c. Furthermore, the reference numeral 30 denotes a main nozzle comprising a funnel portion 30a and a nozzle portion 30b. The main nozzle 30 receives the raw material supplied from each of the nozzles 29a to 29c and supplies the received raw material to the rotary pot 1.

In the raw material supplying section 2 (shown in FIG. 1), for the purpose of providing a cotton candy product with its own flavor or color so as to meet the needs of customers, each of the hoppers 24a to 24c may be filled with sugar (granular sugar) with a different additive in advance. In addition, the amounts of the raw material to be supplied from the respective hoppers 24a to 24c may be adjusted by the metering distributors 28a to 28c shown in FIG. 12B as needed. In other words, the amount of the raw material from each of the hoppers 24a to 24c is adjusted by turning the disc 31 having pores with different diameters by a driving motor 32. In this embodiment, by the way, the raw material supplying section 2 has three hoppers 24a to 24c but is not limited thereto. The number of the hoppers can be varied as required.

Figure 13:
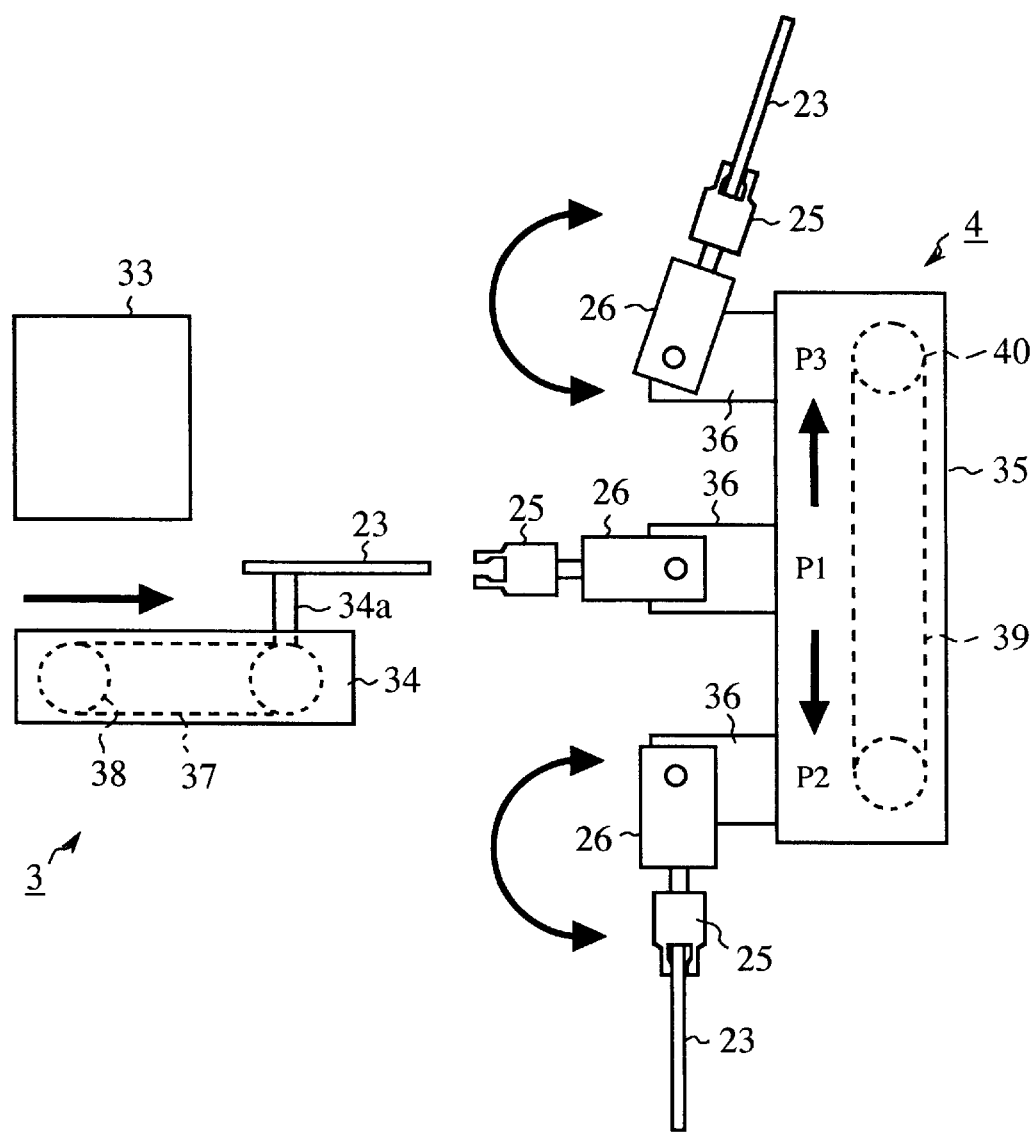
FIG. 13 is a schematic diagram that illustrates a stick supplying section and a up-and-down section for moving the stick up or down in the cotton candy making machine in accordance with the first embodiment of the present invention.

FIG. 13 is a schematic diagram that illustrates the stick supplying section 3 and the up-and-down section 4 for moving the stick up or down in the cotton candy making machine of the first embodiment.

In the figure, the reference numeral 33 denotes a container for storing a plurality of floss taking-up sticks 23, 33 denotes a transfer device for pulling one stick out of the container 33 and transferring the stick 23 to the up-and-down section 4 as indicated by the arrow in the figure. The transfer device 34 comprises a chuck 34a for holding a floss taking-up stick, a conveying belt 37, a pair of pulleys 38 for driving the conveying belt 37, and a motor (not shown) for turning the conveying belt 37 around the pulleys 38. The mechanism of the transfer device 34 is well known in the art, so that more detailed explanation will be omitted from the following discussion.

Figure 14:
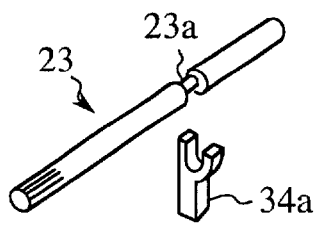
FIG. 14 is a schematic perspective diagram that illustrates another example of the stick and a member for holding such a stick in the cotton candy making machine in accordance with the first embodiment of the present invention.

The floss taking-up stick 23 may be as shown in FIG. 9. Alternatively, as shown in FIG. 14, a recessed portion 23a may be formed on the floss taking-up stick 24, so that it is designed to be more easily held by the chuck 34a of the transfer device 34 when one of the sticks 23 is pulled out of the stick container 33. In addition, the reference numeral 35 denotes an up-and-down device for moving the stick holder 26 that holds a stick 23 up or down, and 36 denotes a rotary motor for changing the orientation of the stick holder 26 vertically or horizontally as indicated by the arrows in the figure. The up-and-down device 35 comprises a conveying belt 39 for moving the stick holder 26 and the rotary motor 36 up or down, a pair of pulleys 40 for driving the conveying belt 39, and a driving motor (not shown) for turning the conveying belt 39 around the pulleys 40. The mechanism of the up-and-down device 35 is well known in the art, so that more detailed explanation will be omitted from the following discussion.

The floss taking-up stick holder 26 includes a chuck 25 for holding a stick 23. As shown in FIG. 13, the stick holder 26 can be moved toward or away from a first position (P1) on the middle of the up-and-down section 4, a second position (P2) on the lower side, and a third position (P3) on the upper side of the up-and-down section 4.

At the first position (P1), the chuck 25 of the stick holder 26 turns its orientation to direct the chuck 25 toward a floss taking-up stick 23 in the horizontal direction and then the chuck 25 receives the stick 25 transferred by the transfer device 34 of the stick supplying section 3 to hold.

At the second position (P2), the chuck 25 shifts to a perpendicular orientation so that the stick 23 is positioned at a predetermined angle with respect to the rotary pot 11 of the cotton candy making section 1. Therefore, threaded sugar issuing from the rotary pot 11 can be wound on the stick 23 to make a cotton candy.

The third position (P3) is the site to take the cotton candy on the stick out of the cotton candy making machine. In this position, the chuck 25 turns to direct the stick 23 upward.

We will explain the operation of the cotton candy making machine having the configuration described above. At first, a sheet of the soil-preventing paper 14 is placed over the inside of the basin 13. Alternatively, several sheets of the soil-preventing paper 14 may be placed. Moreover, both the fixing cylinder (paperweight) 15 for holding the paper down and the stopper (one touch clamp mechanism) 16 are used to fix the paper 14 on the inside of the basin 13. The stick 23 is passed from the stick-supplying section 3 to the stick holder 26 being located at the first position (P1). Then, the stick holder 26 is moved to the second position (P2) by the up-and-down device 35. The stick 23 held by the stick holder 26 is oriented downwardly in the vertical direction and positioned in the inside of the basin 13 as shown in FIG. 10 (or FIG. 11A). Alternatively, the stick 23 held by the stick holder 26 is oriented in the horizontal direction and positioned in the inside of the basin 13 as shown in FIG. 14. Alternatively, the stick 23 held by the stick holder 26 is oriented downwardly at a predetermined angle with respect to the basin 13 and positioned in the inside of the basin 13. If the stick 23 is placed in the basin 13, the stick 23 starts to rotate to twirl floss-like thread sugar thereon. The predetermined amount of the raw material is supplied from the raw material supplying section 2 to the rotary pot 11 through a main nozzle 30. The rotary pot 11 is concentrically arranged in the basin 13 and they can be rotated together by a driving motor 12. The sugar becomes fine threaded sugar as the sugar is heated by a heater (not shown in the figure) included in the rotary pot 11. Consequently, the fine thread sugar is flied outside through a plurality of pores (mesh) (not shown in the figure) formed on the peripheral surface of the rotary pot 11 by centrifugal force resulting from the rotation of the rotary pot 11. The flying threaded sugar is suspended in the space between the rotary pot 11 and the basin 13, which are rotating together.

The rotating stick 23 takes up the sugar floss in the air so that sugar filaments are wound around the stick 10. At this time, the stick 23 is inclined at the predetermined angle with respect to a rotation axis of the rotary pot 11. the predetermined angle with respect to a rotation axis of the rotary pot 11. Thus, it prevents the possibility that a blast of air (indicated by the arrow C in FIG. 11) blows hard from the rotary pot 11 against the peripheral surface of the growing cotton candy. Furthermore, the basin 13 rotates together with the rotary pot 11, so that there is no need to turn the floss taking-up stick 23 around the rotation axis A of the rotary pot 11. Therefore, we can make a cotton candy without losing its desired shape without difficulty.

If the predetermined amount of the sugar filaments are wound onto the stick 23, the rotation of the stick 70 is stopped. Then, the holder 26 turns the stick 23 in an upward direction and shifts its position toward the third position (P3). At the third position (P3), we can take the cotton candy out of the cotton candy making machine.

As can be seen from the foregoing, the cotton candy making machine of the first embodiment provides a great improvement on the prior art. According to the present embodiment, the cotton candy making machine uses a sheet of soil-preventing paper 14 and a floss taking-up stick 23 made of paper, so that it prevents a basin 13 or the like from being spoiled and offers a superior level of safety. In addition, a rotation axis A of the rotary pot 11 and the basin 13 or a rotation axis B of the floss taking-up stick 23 is inclined at a predetermined angle with respect to each other. Thus, the possibility that a blast of air C from the rotary pot 11 blows hard against the peripheral surface of the cotton candy 100 can be minimized, so that we can easily make a cotton candy without losing its desired shape.

Embodiment 2

Figure 15:
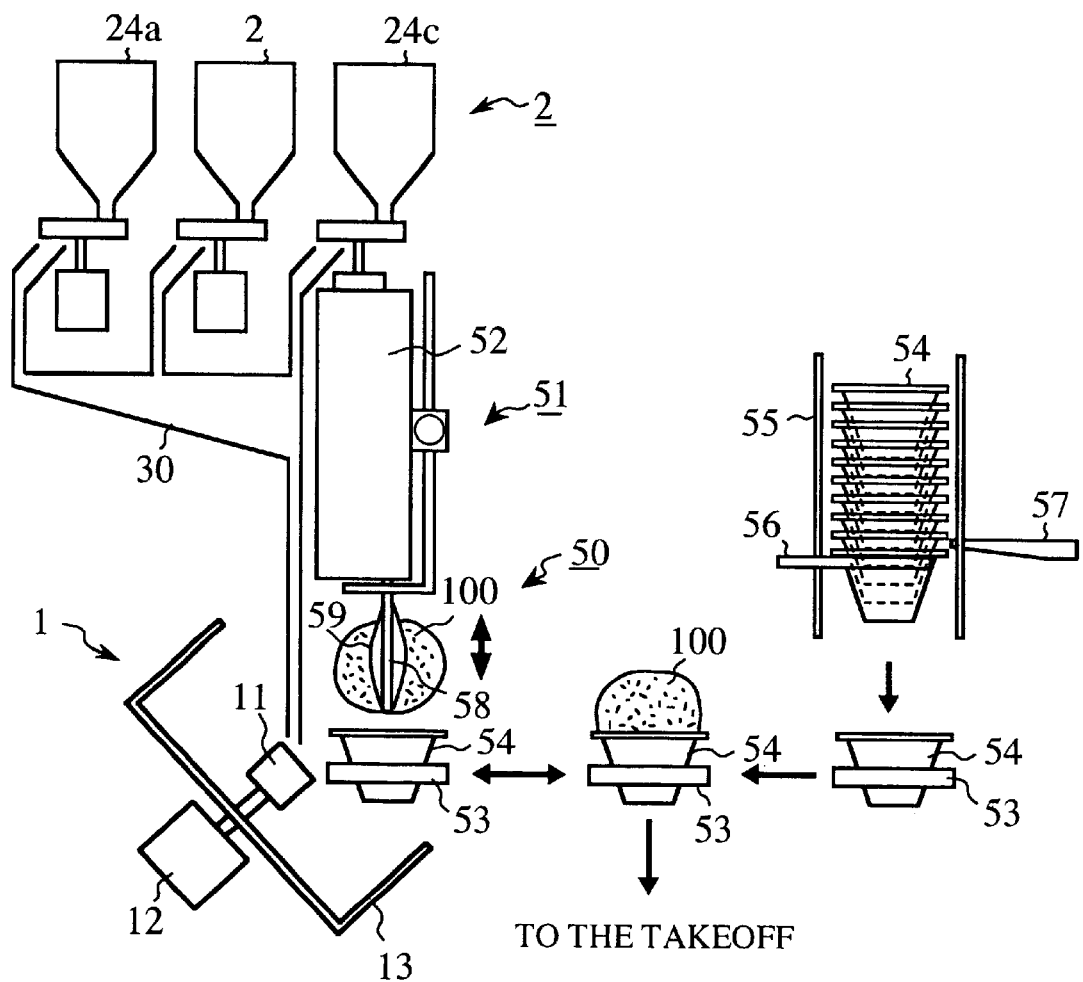
FIG. 15 is a schematic diagram that illustrates a general configuration of a cotton candy making machine as a second embodiment of the present invention.
Figure 16:
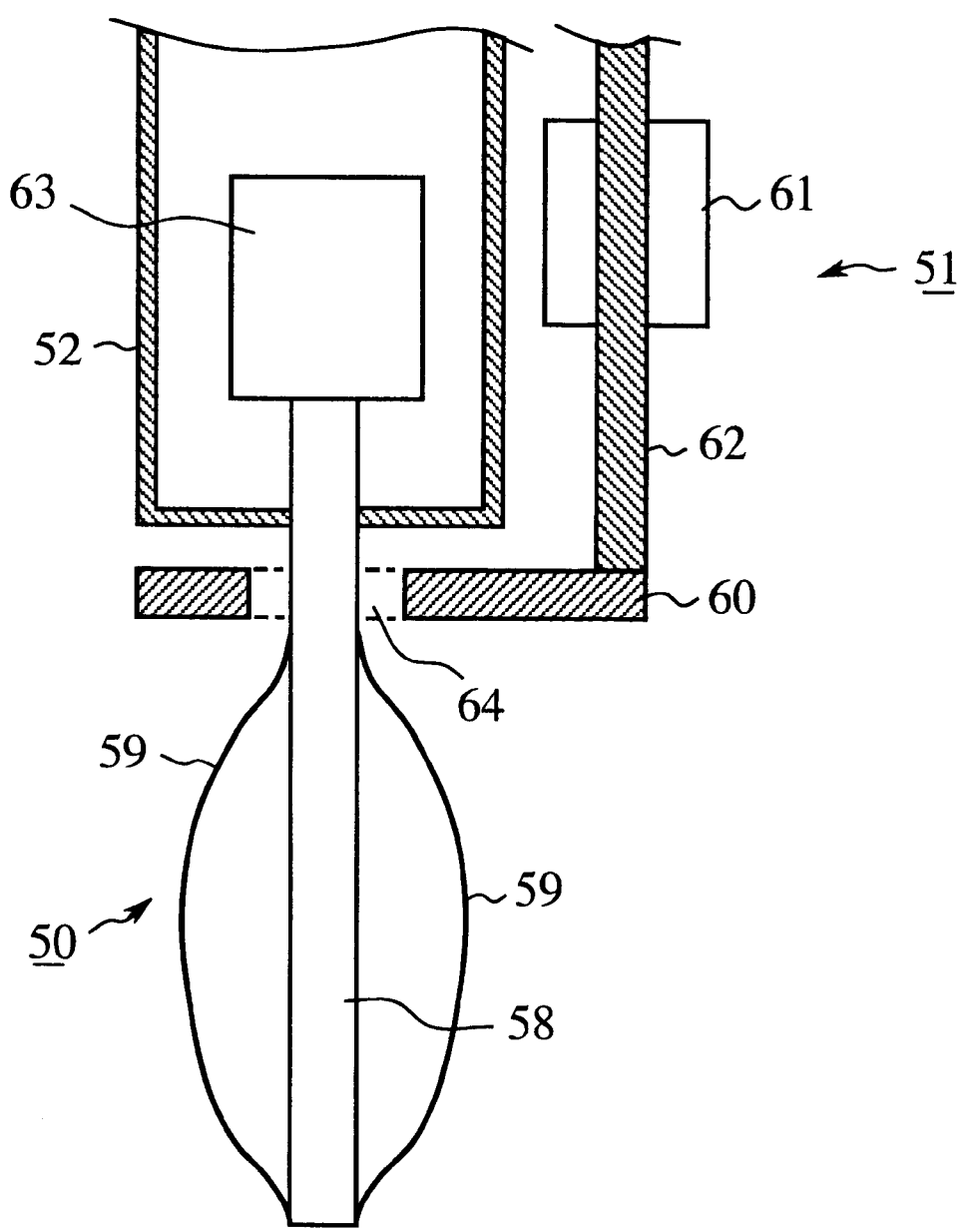
FIG. 16 is a schematic cross sectional diagram that illustrates a means for taking up the cotton candy in the cotton candy making machine provided as the second embodiment of the present invention.

FIG. 15 is a schematic diagram that illustrates a general configuration of a cotton candy making machine as a second embodiment (Embodiment 2) of the present invention. In this embodiment, the cotton candy making machine is constructed of the same components as those of the first embodiment shown in FIG. 1, except that a container (e.g., cup, bowl, or box) is used instead of a floss taking-up stick. In the figure, the reference numeral denotes a cotton candy making section, 2 denotes a raw material supplying section for supplying sugar (granular sugar) as the raw material to the cotton candy making section 1, 50 denotes a means for making a cotton candy 100 in roughly spherical form by twirling threaded sugar on a stick (hereinafter, referred to as a floss taking-up section), 51 denotes a means for removing the cotton candy from the floss taking-up section 50 (hereinafter, referred to as a cotton candy extruding section), and 52 denotes an up-and-down section for moving the floss taking-up section 50 toward the cotton candy making section 1. In addition, the reference numeral 53 denotes a cup holder that holds a cup 54 for receiving a cotton candy 100 released from the floss taking-up section 50, 55 denotes a cup container in which cups 54 are piled vertically, and 56 and 57 denote hooks for separating the cups 54 piled vertically in the cup container 53 one after another for depressing the cup 54. These construction components are arranged so that motion or operation of individual components effect each other under the control of a control unit (not shown). FIG. 16 is a schematic cross sectional diagram that illustrates both the floss taking-up section 50 and the cotton candy extruding section 51.

In the figure, the reference numeral 58 denotes a floss taking-up stick and 52 denotes the up-and-down section in which a driving motor 63 is coaxially connected to the end of the stick 58. The driving motor 63 imparts a rotation motion of the stick 58. The reference numeral 59 denotes leaf springs provided on a peripheral surface of the stick 58 and extended in the axial direction. the leaf springs 59 are equally spaced from each other on the peripheral surface of the stick 58 and their middle portions are outwardly bent in the direction of the radius of the stick 58. The cotton candy extruding section 51 is constructed of these structural components.

In addition, the reference numeral 60 denotes a means for extruding a cotton candy 100 from the stick 58. In this embodiment, the extruding means 60 is provided as a plate member that extends in the horizontal direction (i.e., in the direction perpendicular to the stick 58), so that hereinafter it is referred to as an extruding plate. Moreover, the reference numeral 61 denotes a driving motor that shifts the extruding plate 60 up or down, 62 denotes a shaft that perpendicularly extends from the extruding plate 60 and moves up or down by the driving motor 61, 64 denotes an opening formed on the extruding plate 60 through which the floss taking-up stick 58 is moved.

The movements or operations of both the floss taking-up section 50 and the cotton candy extruding section 51 constructed as above can be controlled by a control unit (not shown in the figure). The control unit controls the following operations. That is, the extruding section 51 is positioned at the upper side of the floss taking-up section 50 when floss-like threaded sugar released from the rotary pot 11 is wound on the stick 58. Then, the cotton candy 100 is extruded from the stick 58 by moving the extruding section 51 down toward the lower side of the floss taking-up section 50 after forming the cotton candy by taking up the predetermined amount of threaded sugar released from the rotary pot 11 on the stick 58.

Figure 17A:
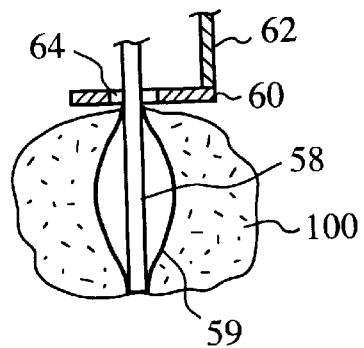
FIG. 17A is a schematic cross sectional diagram that illustrates a means for taking up the cotton candy in the cotton candy making machine during the period of making a cotton candy.
Figure 17B:
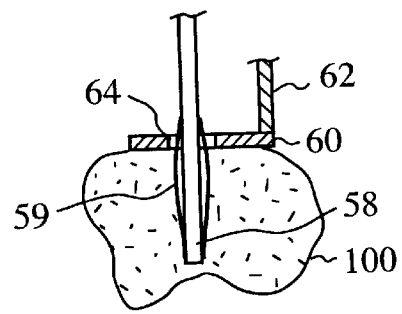
FIG. 17B is a schematic cross sectional diagram that illustrates a means for taking up the cotton candy in the cotton candy making machine at the time of completing the stage of making the cotton candy.
Figure 17C:
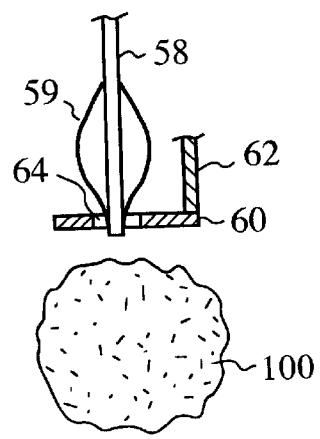
FIG. 17C is a schematic cross sectional diagram that illustrates a means for taking up the cotton candy in the cotton candy making machine at the time of dropping the cotton candy from the stick.

Referring now to FIGS. 17A to 17C, the motions of both the floss taking-up section 50 and the cotton candy extruding section 51 are further described. In FIG. 17A, the extruding plate 60 is positioned at the upper side of the floss taking-up stick 58 as the shaft 62 is moved upward by the rotation of the motor 61 (see FIG. 16). In this state, as shown in the figure, the leaf springs 59 are not pressed by the edge of the opening 64 of the extruding plate 60. Thus, the leaf springs 59 are extended outwardly in the direction of the radius of the stick 58, allowing a sufficient radial clearance between each of the leaf springs 59 and the peripheral surface of the stick 58. Under such a condition, the driving motor 63 imparts a rotation motion of the floss taking-up stick 58.

Extruded threaded sugar generated by heating the granular sugar in the rotary pot 11 by its internal heater (not shown) is wound on the rotating stick 58 and the leaf springs 59.

As shown in FIG. 17B, subsequently, the rotation of the driving motor allows the shaft 62 to move down toward the tip of the stick 58, while the spring plates 59 are pressed against the peripheral surface of the stick 58 by the edge of the opening formed on the extruding plate 60. It looks as if the extruding plate 60 extrudes a cotton candy 100 from the floss taking-up stick 50 when the extruding plate 60 pushes the cotton candy 100 in the downward direction.

As shown in FIG. 17C, the cotton candy 100 comes off the stick 58 as the extruding section 51 is moved down furthermore.

As shown in FIG. 15, the falling cotton candy 100 is received by a cup 54 described below. Before receiving the cotton candy 100, the cup 54 is pulled out of a cup hopper 55 by hooks 56, 57 and placed on a cotton candy falling position by a cup holder 53.

Then, the cup 54 having the cotton candy 100 is transferred to a takeoff from which the cotton candy 100 takes off.

The mechanisms of moving the cup holder 53 and taking the cup 54 out of the cup hopper 55 are well known in the art, so that such mechanisms will be omitted from the following discuss in the interest of simplicity. By the way, the cup 54 can be shaped as a typical cup having a thick rim as shown in FIG. 15 but is not limited in this respect. A specific cup shown in FIGS. 18A to 18C, or the like.

Figure 18A:
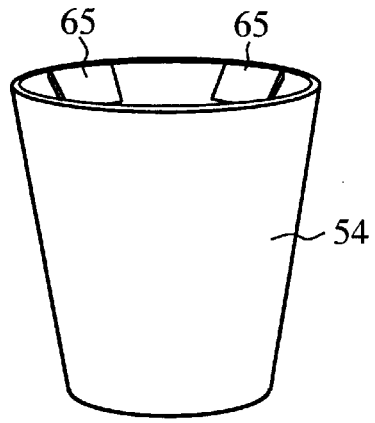
FIG. 18A is a perspective diagram of a cup to be used for receiving a cotton candy dropped from the means for taking the cotton candy in the cotton candy making machine.
Figure 18B:
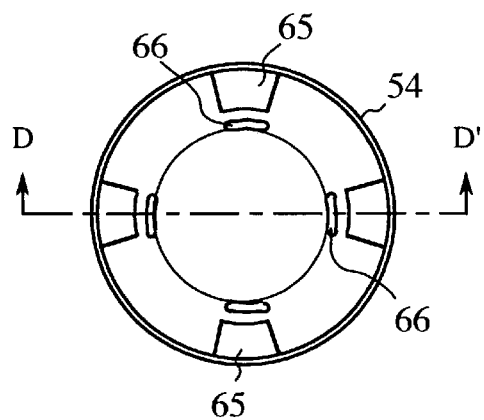
FIG. 18B is a top view of the cup shown in FIG. 18A.
Figure 18C:
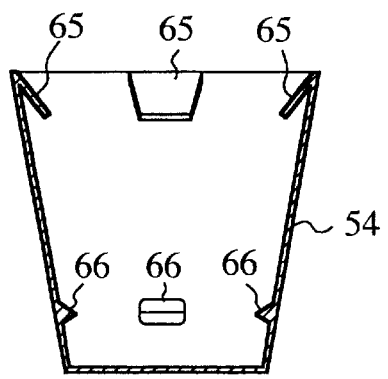
FIG. 18C is a cross sectional view of the cup across the line D–D' in FIG. 18B.

The cup 54 shown in FIGS. 18A to 18C is constructed of a cup body, two or more hooks 65 formed on a rim of the body and inwardly extended in a slanting downward direction, and two or more horizontal projections 66 forming narrow shelves on the lower part of inner peripheral surface of the body. The hooks 65 are responsible for holding a cotton candy 100, while the projections are responsible for easily slipping one cup into or out of another cup.

Figure 19:
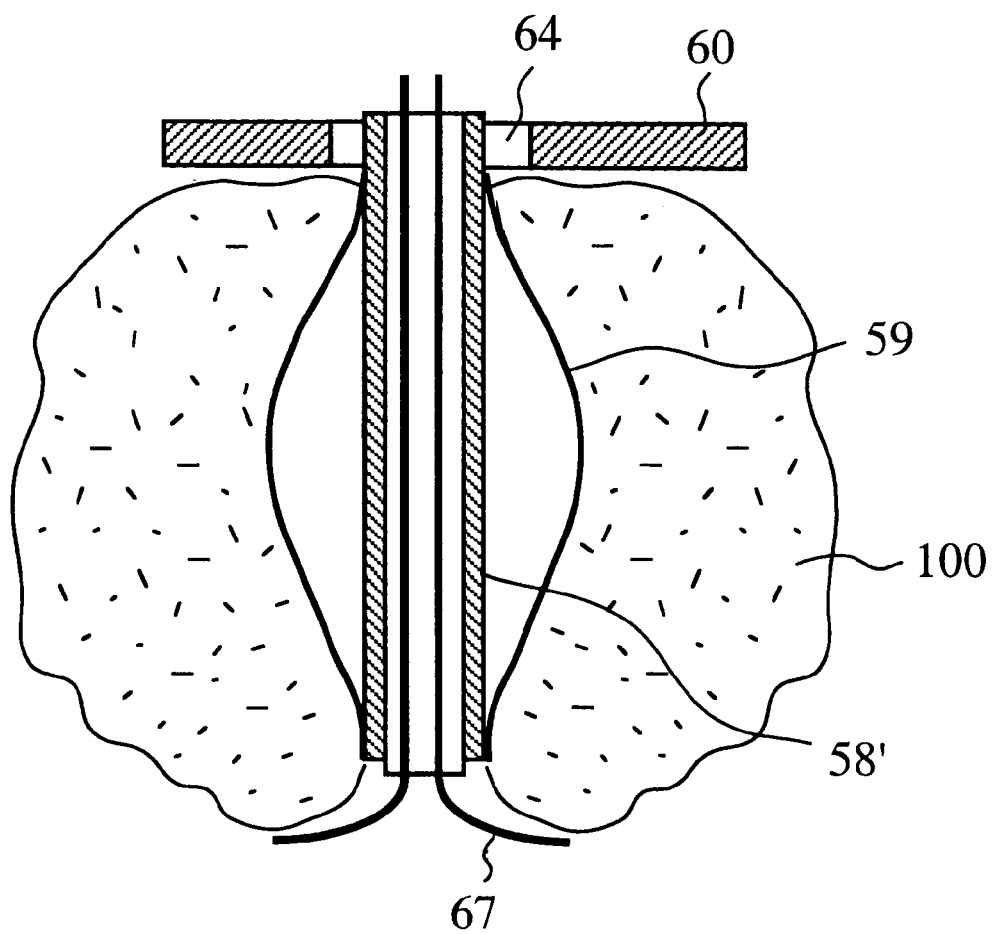
FIG. 19 is a schematic cross sectional view that illustrates a means for taking up a cotton candy in the cotton candy making machine during the period of making a cotton candy.
Figure 20:
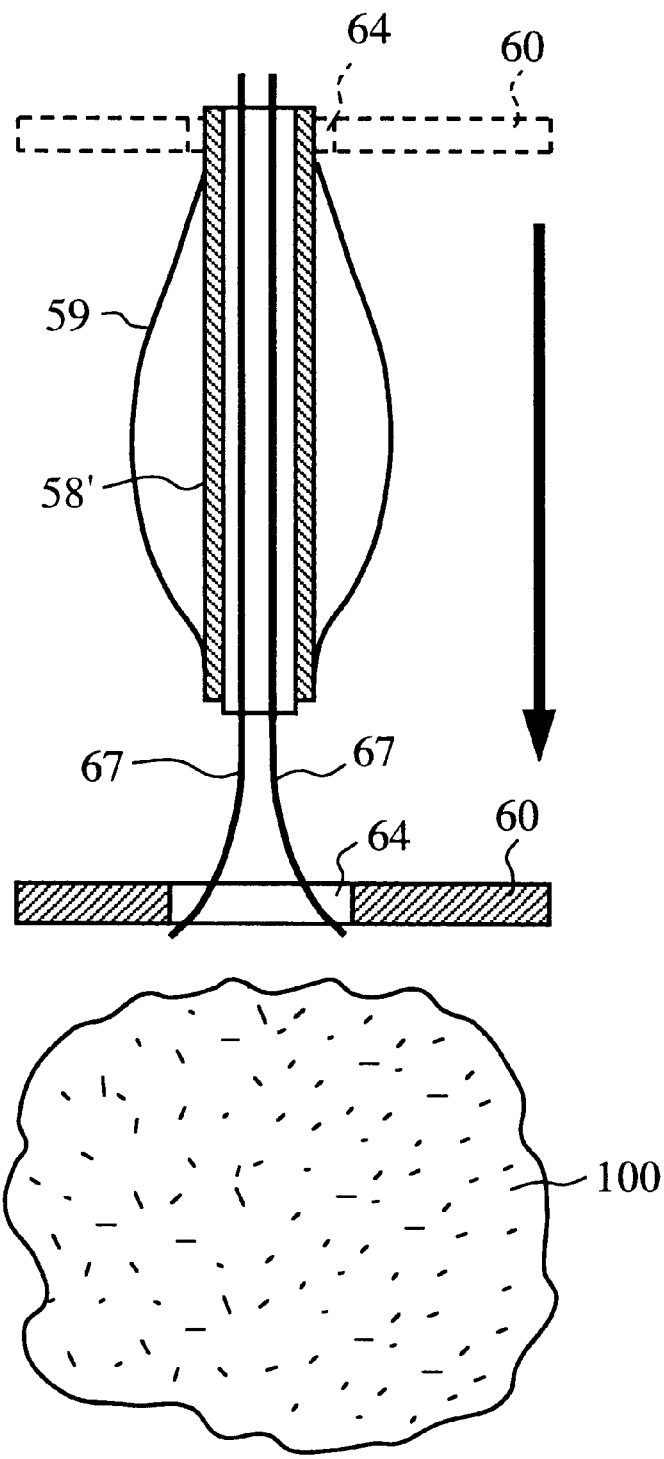
FIG. 20 is a schematic cross sectional view that illustrates a means for taking up a cotton candy in the cotton candy making machine at the time of dropping a cotton candy from the stick.

FIGS. 19 and 20 illustrate a modified example of the second embodiment in which two or more leaf springs 67 are provided on the tip of a floss taking-up stick 58' in addition to the leaf springs 59 for supporting a cotton candy. FIG. 19 illustrates a state of forming a cotton candy on the stick 58' and FIG. 20 illustrates a state of releasing the cotton candy from the stick. In this case, just as in the case of shown in FIG. 17, the shaft 62 is moved upward by the rotation of the driving motor 61, so that the extruding plate 60 is positioned at the upper side of the stick 58' and the leaf springs 59, 67 are not pressed by the edge of the opening 64 formed on the extruding plate 60. Thus, the leaf springs 59, 67 are extended outwardly in the direction of the radius of the stick 58', allowing a sufficient radial clearance between each of the leaf springs 59 and the peripheral surface of the stick 58' and forming a supporting structure that prevents the fall of the growing cotton candy 100 from the stick 58'. Under such a condition, the driving motor 63 imparts a rotation motion of the floss taking-up stick 58'. Consequently, extruded threaded sugar is generated by heating the granular sugar in the rotary pot 11 by its internal heater (not shown) and wound on the rotating stick 58' and the leaf springs 59.

Subsequently, the rotation of the driving motor 61 allows the shaft 62 to move down toward the tip of the stick 58, while the leaf springs 59 are pressed against the peripheral surface of the stick 58' and also the leaf springs 67 are closed together by the edge of the opening formed on the extruding plate 60. The extruding plate 60 pushes the cotton candy 100 in the downward direction as if the extruding plate 60 extrudes a cotton candy 100 from the stick 58'.

As shown in FIG. 20, the cotton candy 100 comes off the stick 58' as the extruding section 51 is moved down furthermore. The falling cotton candy 100 is received by the cup 54 just as described above.

In this embodiment, furthermore, it is noted that soil-preventing paper may be applied just as in the case of the first embodiment to keep the basin and so on from being spoiled by the raw material.

As can be seen from the foregoing, the second embodiment of the present invention provides a great improvement on the prior art by supplying a cotton candy machine using a floss taking-up stick 58 or 58' during only the step of twirling threaded sugar thereon and a cup 54 for receiving a resulting cotton candy to be dropped from the stick 58 or 58' while offering a superior level of safety. In addition, the cotton candy machine may use a sheet of soil-preventing paper 14, so that a basin 13 or the like can be kept from being spoiled. In this embodiment, furthermore, a rotation axis A of the rotary pot 11 and the basin 13 is inclined at a predetermined angle with respect to the stick 58 or 58', so that the possibility that a blast of air C issued from the rotary pot 11 strongly touches the side surface of a cotton candy 100 can be minimized. Thus, there is no irregular portion on the resulting cotton candy 110.

Embodiment 3

A cotton candy making machine according to this third embodiment (Embodiment 3) uses a stick for taking up a cotton candy, in which a body of the stick contains a predetermined amount of sugar. In the first and second examples described above (see FIG. 1 and FIG. 15), the supply of sugar is performed using hoppers 24a, 24b, and 24c. In this third embodiment, on the other hand, a predetermined amount of sugar can be supplied in a rotary pot 11 without using those hoppers 24a, 24b, and 24c.

Figure 21:
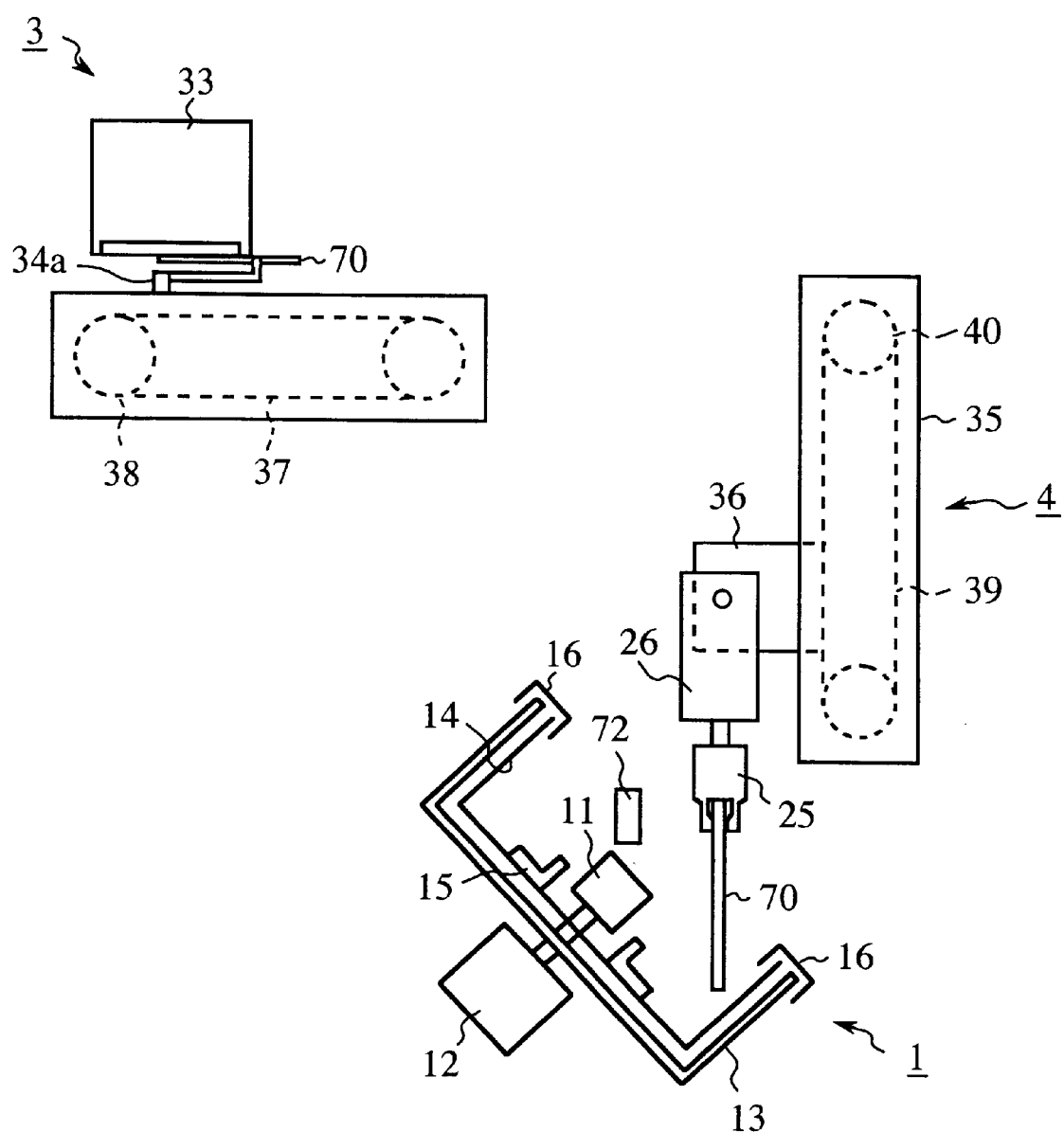
FIG. 21 is a schematic diagram that illustrates a general configuration of a cotton candy making machine as a third embodiment of the present invention.

FIG. 21 is a schematic diagram that illustrates a general configuration of a cotton candy making machine in accordance with the third embodiment of the present invention. In the figure, the reference numeral 1 denotes a cotton candy making section, 2 denotes a raw material supplying section for supplying a raw material (i.e., granular sugar) to the cotton candy making section 1, 3 denotes a stick supplying section for reserving floss taking-up sticks 70 and supplying each stick 70 for twirling threaded sugar thereon, and 4 denotes a stick up-down section for moving the stick 70 supplied from the stick supplying section to the cotton candy making section 1 and also moving the stick 70 so that a tip of the stick 70 is punctured with a sugar-supplying guide member being arranged in the proximity of a rotary pot 11. The movements of these structural components are coordinated with each other under the control of a control section (not shown).

Figure 22:
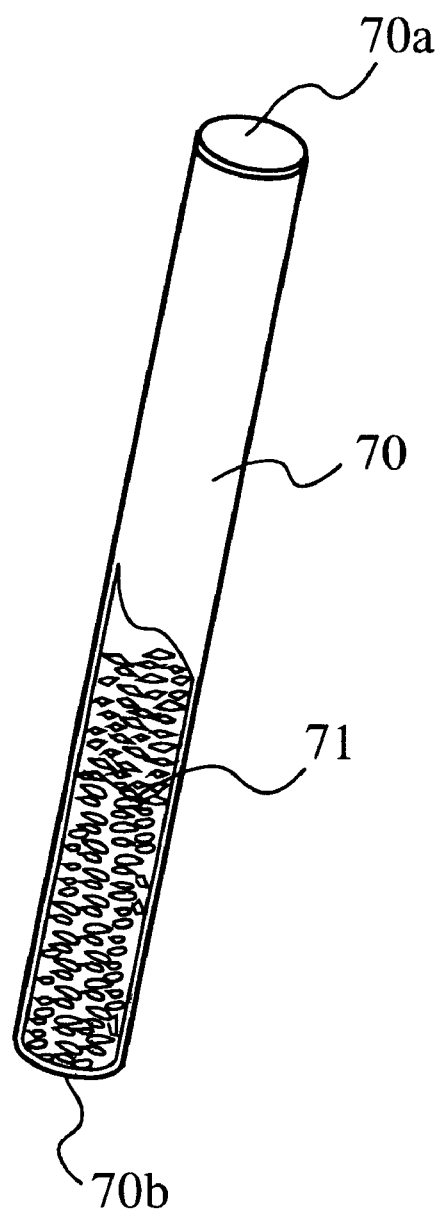
FIG. 22 is a partial cross sectional view that illustrates a stick for taking up a cotton candy in the cotton candy making machine provided as the second embodiment of the present invention.

FIG. 22 is a partial cross sectional diagram for explaining a construction of the sugar-containing stick (hereinafter, simply referred to as a stick) to be used for taking up a cotton candy in the cotton candy making machine in accordance with the third embodiment as shown in FIG. 21. In the figure, the reference numeral 70 denotes a cylindrical-shaped stick for taking up a cotton candy, 70a and 70b denote paper lids that close the opening ends of the stick, and 71 denotes sugar granules being contained in the stick 70.

Figure 23:
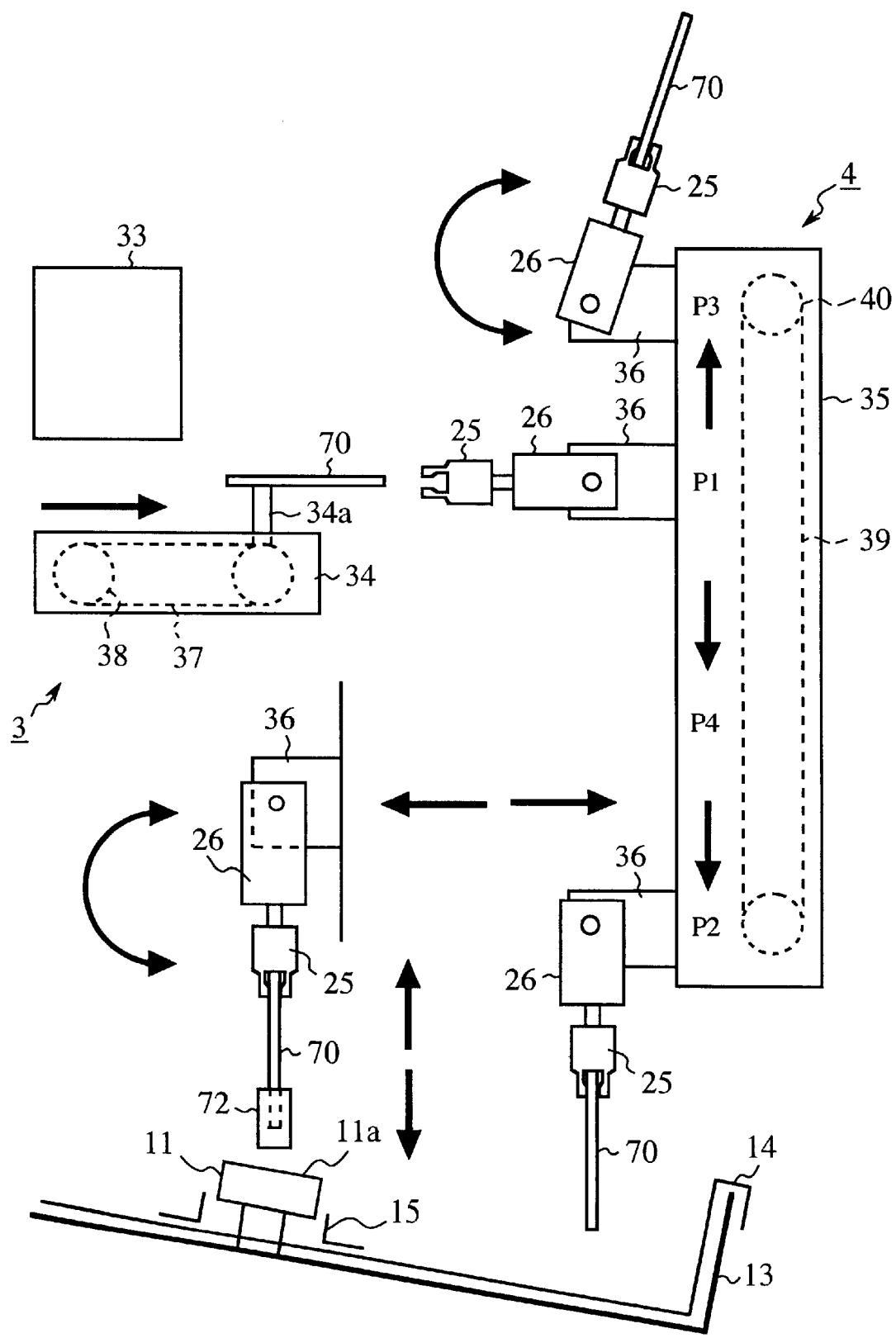
FIG. 23 is a schematic diagram that illustrates a means for supplying the stick for taking up a cotton candy and a mans for moving the stick up and down to be used in the cotton candy making machine in accordance with the third embodiment of the present invention.

FIG. 23 is a schematic diagram that illustrates the stick supplying section 3 and the stick up-down section 4 to be applied in the cotton candy making machine in accordance with the third embodiment. In the figure, the reference numeral 33 denotes a container for storing a plurality of floss taking-up sticks 70, 33 denotes a transfer device for pulling one stick 70 out of the container 33 and transferring the stick 70 to the up-and-down section 4 as indicated by the allow in the figure. In addition, the reference numeral 35 denotes an up-and-down device for moving the stick holder 26 that holds a stick 70 up or down, and 36 denotes a rotary motor for changing the orientation of the stick holder 26 vertically or horizontally as indicated by the arrows in the figure. The floss taking-up stick 70 may be the one shown in FIG. 22. Alternatively, as shown in FIG. 14, a recessed portion 70a may be formed on the floss taking-up stick 70, so that it is designed to be more easily held when one of the sticks 70 to be transferred is pulled out of the stick container 33. In addition, the transfer device 34 comprises a chuck 34a for holding a floss taking-up stick 70, a conveying belt 37, a pair of pulleys 38 for driving the conveying belt 37, and a motor (not shown) for turning the conveying belt 37 around the pulleys 38. The mechanism of the transfer device 34 is well known in the art, so that more detailed explanation will be omitted from the following discussion. Furthermore, the up-and-down device 35 comprises a conveying belt 39 for moving the stick holder 26 and the rotary motor 36 up or down, a pair of pulleys 40 for driving the conveying belt 39, and a driving motor (not shown) for turning the conveying belt 39 around the pulleys 40. The mechanism of the up-and-down device 35 is well known in the art, so that more detailed explanation will be omitted from the following discussion.

The floss taking-up stick holder 26 includes a chuck 25 for holding a stick 70. Just as in the case with the first embodiment, as shown in FIG. 70, the stick holder 26 can be moved toward or away from a first position (P1) on the middle of the up-and-down section 4, a second position (P2) on the lower side, and a third position (P3) on the upper side of the up-and-down section 4. In this third embodiment, furthermore, an additional fourth position (P4) is provided between the first position (P1) and the second position (P2). That is, the fourth position (P4) located on the passage from the first position (P1) to the second position (P2) is responsible for moving the stick 70 above a sugar-charging guide member 72 positioned above an opening 11a of the rotary pot 11 of the cotton candy making section 1, and then moving the stick 70 down so that the tip of the stick 70 is inserted into the guide member 72 followed by pulling the stick 70 out of the guide member 72 for releasing sugar from the inside of the stick 70.

Figure 24:
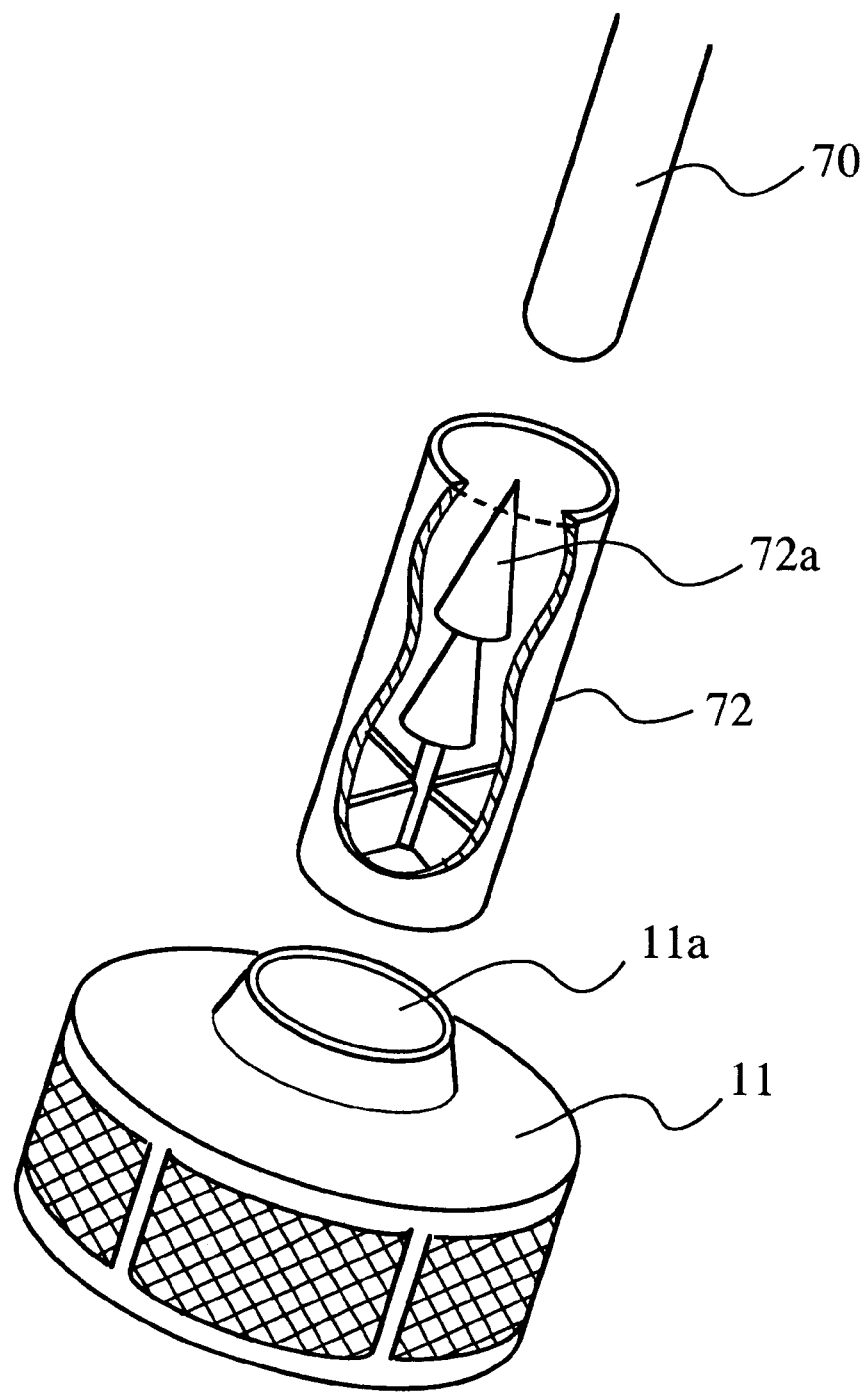
FIG. 24 is a partial cross sectional perspective diagram that illustrates a device for charging a predetermined amount of sugar into a rotary pot of the cotton candy making machine in accordance with the third embodiment of the present invention.

FIG. 24 is a schematic diagram that illustrates a floss taking-up stick, a charging guide member, and a rotary pot of the cotton candy making machine of the third embodiment. In the figure, the reference numeral 11 denotes a rotary pot, 11a denotes an opening of the rotary pot 11, 72 denotes a charging guide member which is shaped like a cylinder, 72a denotes a rod concentrically formed in the cylinder 7 and has a conical-shaped tip portion for breaking the paper rid of the stick 70 and raking out the sugar. The diameter of the conical tip of the stick 70 is smaller than the inner diameter of the stick 70.

Now, the operation of the cotton candy making machine constructed as described above will be described in detail. First, as in the case of the first embodiment, a sheet of soil-preventing paper 14 is placed over the inside of the basin 13. Alternatively, several sheets of the soil-preventing paper 14 may be placed. Moreover, both the fixing cylinder (paperweight) 15 for holding the paper down and the stopper (one touch clamp mechanism) 16 are used to fix the paper 14 on the inside of the basin 13. The stick 70 is passed from the stick-supplying section 3 to the stick holder 26 being located at the first position (P1). Then, the stick holder 26 is moved to the fourth position (P2) by the up-and-down device 35. The stick 70 held by the stick holder 26 is oriented downwardly in the vertical direction as shown in FIG. 70 (alternatively, oriented in the horizontal direction just as in the case of FIG. 11). Subsequently, the stick up-and-down section 4 is moved horizontally by a driving means (not shown) so that the tip of the stick 70 fronts on the opening of the charging guide member 72. In such a state, the stick 70 is moved up and down by the actuation of the up-and-down section device 35. As a result, sugar granules 71 are released from the stick 70 as the paper lid 70b on the tip of the stick 70 is broken by the conical tip portion of the rod 72a. The released sugar granules 71 are poured into the opening 11a of the rotary pot 11 through the guide member 72.

Following the above steps, the stick up-and-down section 4 is returned to the original position in a horizontal direction by the driving means (not shown) and then the up-and-down device 45 shifts the stick 70 to the second position (P2). The stick 70 held by the chuck 25 of the stick holder 26 is oriented in a downward direction (or a horizontal direction) and positioned in the basin 13. Subsequently, the driving motor in the stick holder 26 imparts a rotary motion to the stick 70, while the driving mechanism (driving motor) 12 imparts a rotary motion to the rotary pot 11 which is concentrically arranged in the basin 13. In this case, the basin 13 is also rotated together with the rotary pot 11. The granular sugar is heated by a heater (not shown) in the rotary pot 11 and becomes fine threads of sugar. The fine threads of sugar are outwardly discharged from a plurality of pores (meshes) (not shown) formed on the peripheral surface of the rotary pot 11 by centrifugal force generated by the rotary motion of the rotary pot 11. Floss of sugar is suspended in the space between the rotary pot 11 and the basin 13 which are rotated together.

The rotating stick 70 takes up the sugar floss in the air so that sugar filaments are wound around the stick 10. At this time, just as in the case of the first embodiment, the stick 70 is inclined at the predetermined angle with respect to a rotation axis of the rotary pot 11. Thus, it prevents the possibility that a blast of air (indicated by the arrow C in FIG. 11) brows hard from the rotary pot 11 against the peripheral surface of the growing cotton candy. Furthermore, the basin 13 rotates together with the rotary pot 11, so that there is no need to turn the stick 70 around the rotation axis A of the rotary pot 11. Therefore, we can easily make a cotton candy without losing its desired shape.

If the predetermined amount of the sugar filaments are wound onto the stick 70, the rotation of the stick 70 is stopped. Then, the holder 26 turns the stick 70 in a upward direction and shifts its position toward the third position (P3). At the third position (P3), we can take the cotton candy out of the cotton candy making machine.

As can be seen from the foregoing, the cotton candy making machine of the a third embodiment provides a great improvement on the prior art. According to the present embodiment, the cotton candy making machine uses a floss taking-up stick 70 in which the predetermined amount of sugar is being stored. Thus, the predetermined amount sugar can be supplied into the rotary pot 11 without using hoppers 24a, 24b, and 24c for storing sugar and metering distributors 28a, 28b, and 28c for charging the predetermined amount of sugar into the rotary pot 1. As a result, a simplified configuration of the cotton candy making machine can be attained. According to the third embodiment, furthermore, the cotton candy making machine uses a sheet of soil-preventing paper 14 just as in the case of the first embodiment, so that it allows to keep a basin 13 or the like from being spoiled. In addition, the paper stick 70 offers a superior level of safety. In the cotton candy making machine of the third embodiment, a rotation axis A of the rotary pot 11 and the basin 13 or a rotation axis B of the floss taking-up stick 23 is inclined at a predetermined angle with respect to each other. Thus, the possibility that a blast of air C from the rotary pot 11 blows hard-against the peripheral surface of the cotton candy 100 can be minimized, so that we can easily make a cotton candy without losing its desired shape.

Figure 25A:
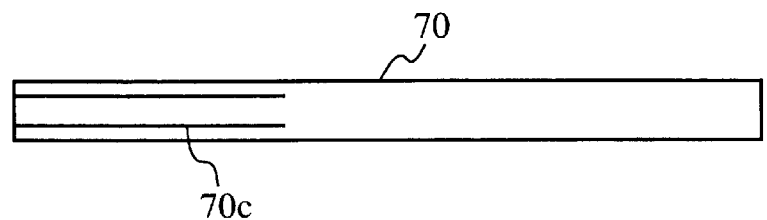
FIG. 25A is a plane diagram that illustrates a modified example of the stick for taking up a cotton candy in the cotton candy making machine in accordance with the present invention.
Figure 25B:
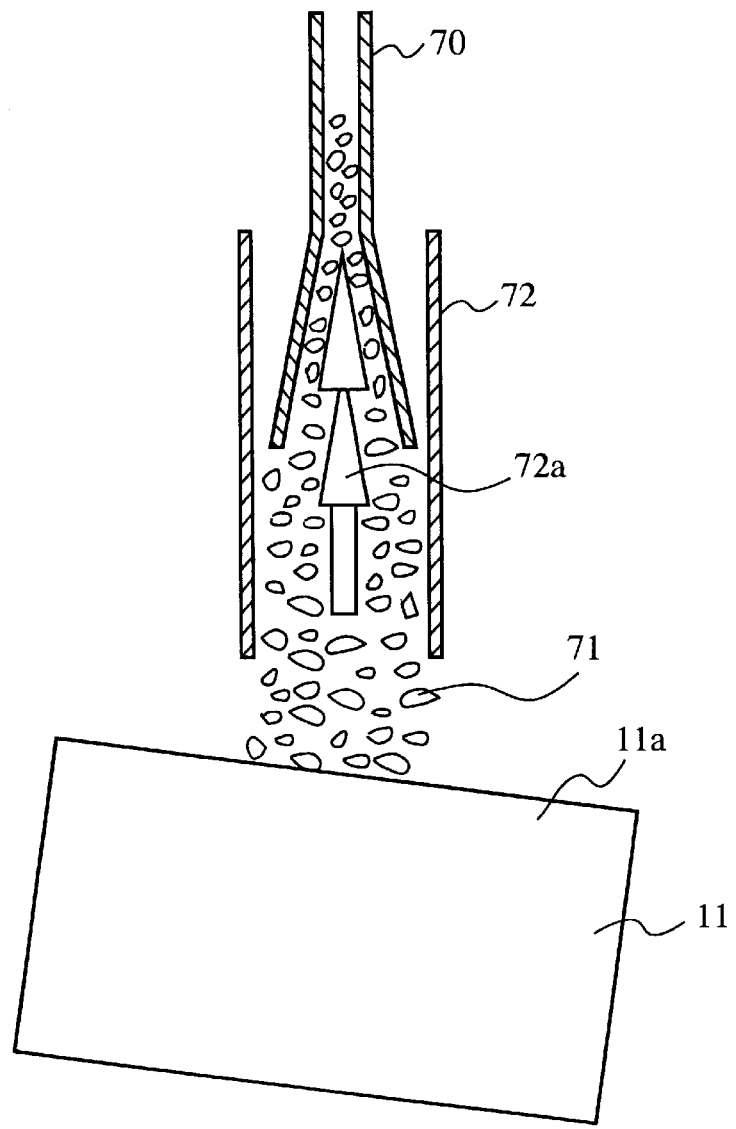
FIG. 25B is a cross sectional diagram that illustrates the same modified example as shown in FIG. 25A.

For making a floss taking-up stick 70 safer to use and for easily charging sugar 71 from the stick into the opening 11a of the rotary pod 11, split lines 70a may be formed on the peripheral surface of the stick 70. The split lines 70a may be from the tip to the middle in an axial direction as shown in FIG. 25A. Regarding the charging guide member 72, the diameter of the conical-shaped tip portion of the rod 72a may be larger than the inner diameter of the stick 70. Thus, split lines 70a of the stick 70 can be opened so that a plurality of strips extend outwardly just as in the case of the stick 23 shown in FIG. 9C when the conical-shaped tip portion of the rod 72a is pushed into the stick 72. The stick 70 having such an extending tip portion offers a superior level of safety and allows the drop of granular sugar easily from the stick 70 into the opening 11a of the rotary pot 11 (FIG. 25B).

Figure 26:
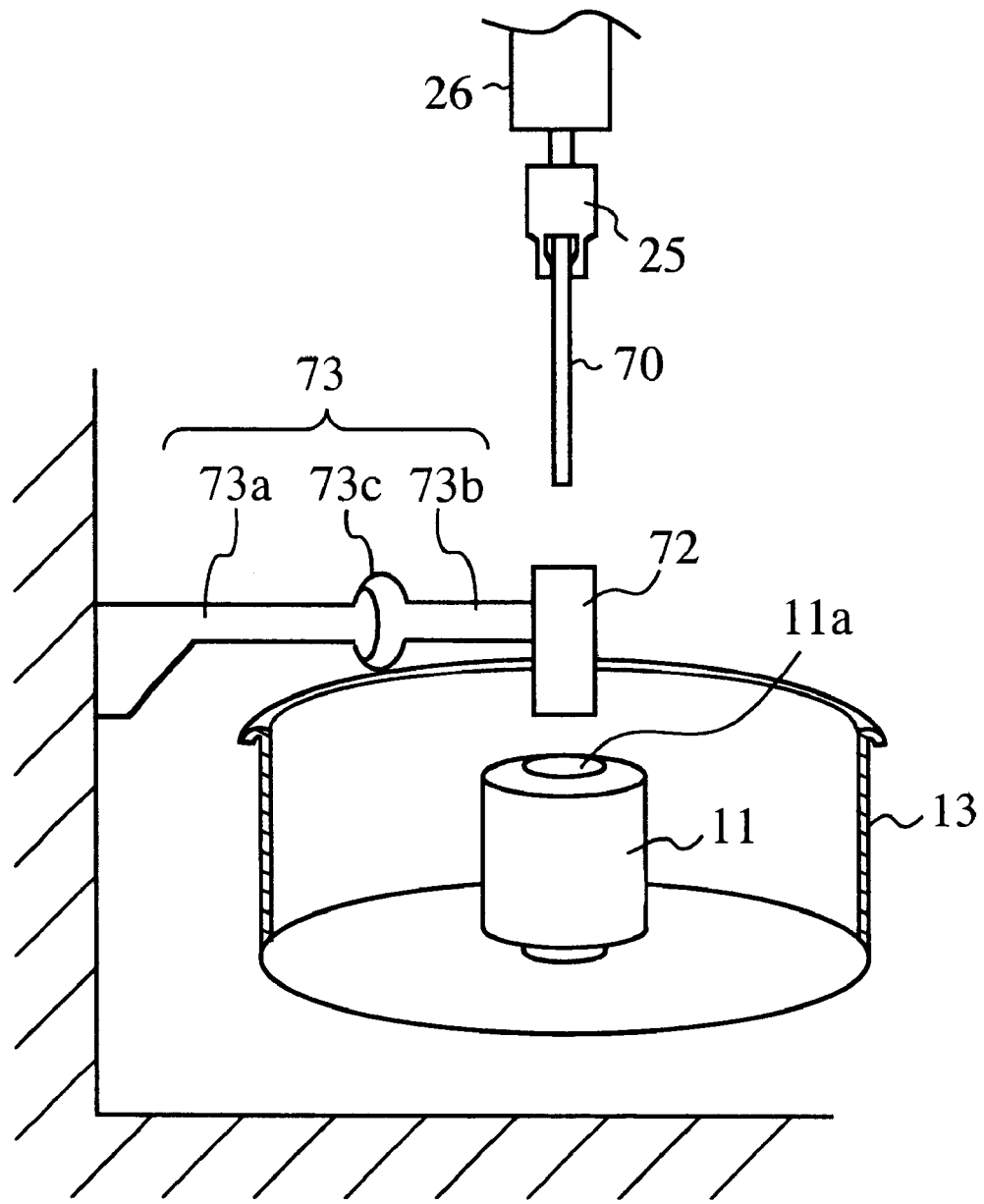
FIG. 26 is a schematic diagram that illustrates a device for charging a predetermined amount of sugar into the cotton candy making machine in accordance with the third embodiment of the present invention.
Figure 27:
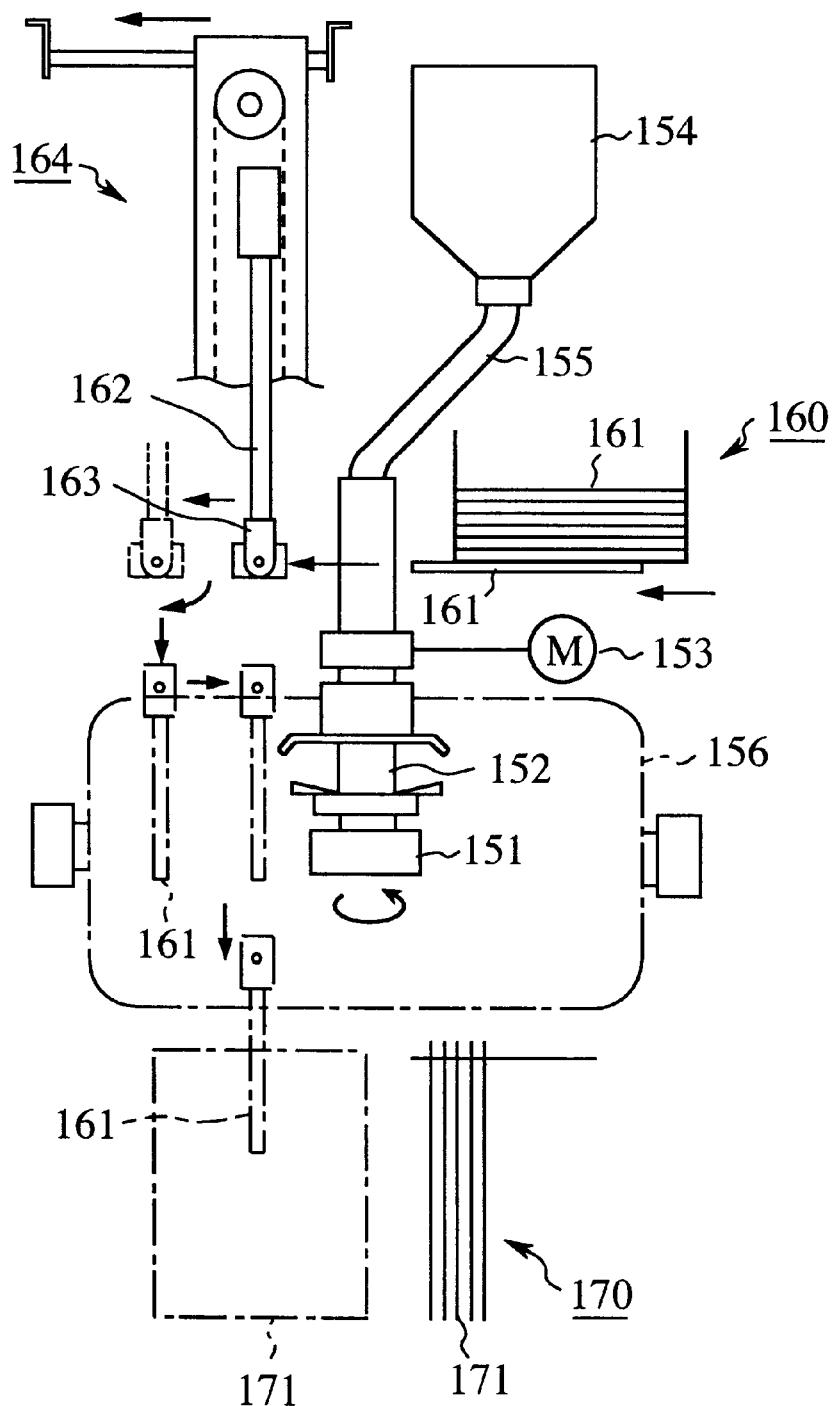
FIG. 27 is a schematic diagram that illustrates an example of the conventional cotton candy making machine.
Figure 28:
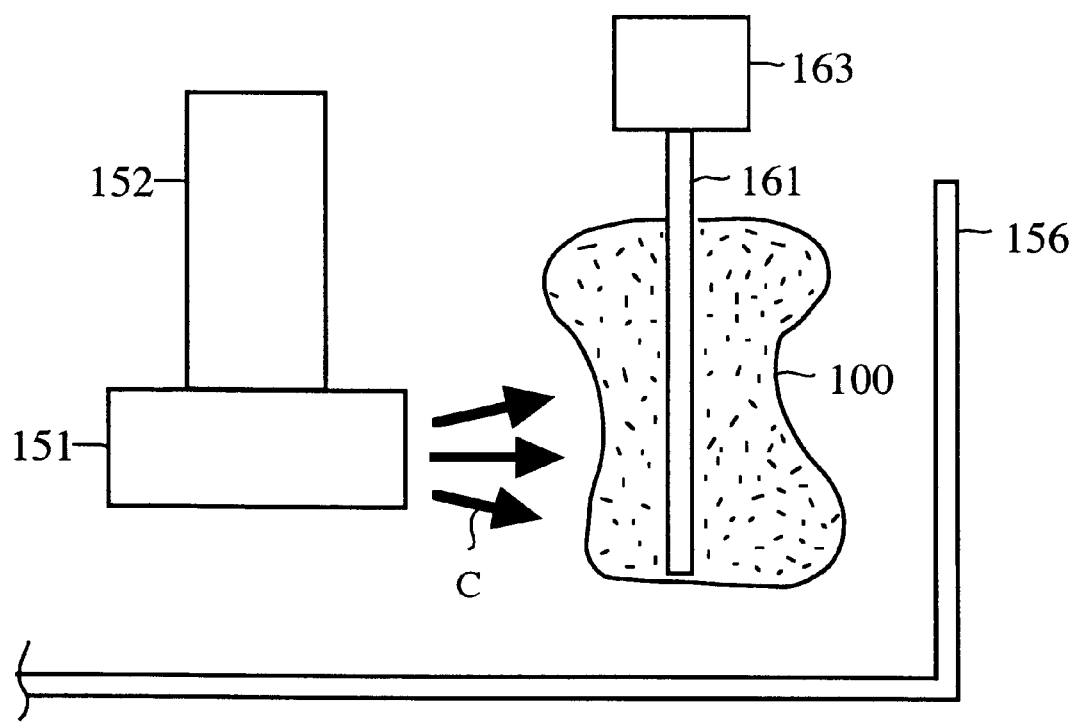
FIG. 28 is a schematic diagram that illustrates the shape of a cotton candy produced by the conventional cotton candy making machine.

As shown in FIG. 26, by the way, the charging guide member 72 may be supported by an arm 73 that extends from the body of the cotton candy making machine. The arm 73 is constructed of a first arm 73a and a second arm 73b which are removably connected to each other by a one-touch joint 73c. One end of the first arm 73a is fixed on the body of the cotton candy making machine, while one end of the second arm 73b is fixed on the charging guide member 72. They can be easily detached from each other when required, for example at the time of cleaning the charging guide member 72.

In summary, as can be seen from the foregoing, the invention provides a cotton candy making machine, comprises: a rotary pot having a rotation axis associated with a driving means, where a heater is included to heat sugar provided as a raw material and release the heated sugar in the form of floss-like threaded sugar from the rotary pot to the outside by rotating the rotary pot around the rotation axis by a rotary motion of the driving means; a basin to be rotated together with the rotary pot, in which the rotary pot is concentrically arranged; a raw material supplying means for supplying the sugar into the rotary pot; and a floss taking-up means that rotates around its axis in a predetermined direction to take up floss-like threaded sugar released from the rotary pot, wherein the rotation axis of the rotary pot and the rotation axis of the floss taking-up means cross each other at predetermined angles. This offers an advantage of being able to prevent the deformation of a cotton candy by a blow of hot air from the rotary pot during manufacturing.

According to the present invention, the floss taking-up means may comprise: a stick made of paper onto which floss-like threaded sugar released from the rotary pot is wound; and a stick holding means for holding the stick, which is able to rotate around an axis thereof for twirling the floss-like threaded sugar onto the stick. This offers an advantage of extremely increasing the safety of the stick in comparison with the conventional stick made of plastic, wood, or the like, such as disposable chop stick.

According to the present invention, the floss taking-up means may comprise: stick onto which floss-like threaded sugar released from the rotary pot is wound; and at least one leaf spring provided around a peripheral surface of the stick, and the cotton candy making machine may further comprise: a cotton candy detaching means for taking the floss-like threaded sugar out of the stick; and a container-supplying means for supplying a predetermined container in which the detached floss-like treaded sugar to provided it as a cotton candy. Therefore, the cotton candy can be provided as a product without using any stick material, so that this offers an advantage of extremely increasing the safety of the stick in comparison with the conventional stick made of plastic, wood, or the like, such as disposable chop stick.

According to the present invention, the cotton candy detaching means may comprise: an extruding means having an opening; and a floss taking-up stick passed through the opening of the extruding means, where the extruding means is able to move in the direction along a rotation axis of the floss taking-up stick, and the leaf spring is pressed toward the rotation axis of the floss taking-up stick by the opening of the extruding means as the extruding means is moved. This offers an advantage of keeping the shape of a cotton candy by preventing that the cotton candy is hanging in the downward direction during the period of making the cotton candy when the stick is oriented vertically in the downward direction.

According to the present invention, a plurality of the cotton candy supporting plates may be arranged on the tip of the floss taking-up stick so as to be radially opened in the direction of the radius of the floss taking-up stick, where the cotton candy supporting plates are radially opened in the radial direction when the extruding means is positioned on the side of the rear end of the floss taking-up stick, while the cotton candy supporting plates are converged as the extruding means moves to the tip of the floss taking-up stick. Therefore, the inner peripheral surface, the bottom, or the like of the basin can be kept from directly being spoiled, so that this allows an advantage of easily keeping the machine in proper condition, especially keeping the basin from being spoiled.

According to the present invention, the cotton candy making machine may further comprise: a sheet of removable soil-preventing paper that covers both the bottom and the inner peripheral surface of the basin; and a fixing means for fixing the soil-preventing paper on the basin. This allows an advantage of easily keeping the machine in proper condition, especially keeping the basin from being spoiled.

According to the present invention, the basin may be at least constructed of a cylindrical-shaped framework; a sheet of removable soil-preventing paper to be provided as at least an inner peripheral surface of the basin; and a fixing means for fixing the soil-preventing paper on the framework. Therefore, the inner peripheral surface of the basin is directly formed from the soil-preventing paper, so that this allows an advantage of easily keeping the machine in proper condition, especially keeping the basin from being spoiled.

According to the present invention, the raw material supplying means may be constructed of a plurality of hoppers communicated with the rotary pot through metering distributors. Therefore, different colored and different flavored sugar can be used to make a cotton candy as needed.

According to the present invention, the floss taking-up stick may be provided as stick that contains the predetermined amount of sugar, and also the cotton candy making machine may further comprises a sugar-charging guide member that allows the charge of sugar from the stick to the rotary pot by opening one end of the stick. Therefore, there is the advantage that a smaller version of the cotton candy making machine can be designed because of no need to install both a sugar-supplying means and a sugar-dispensing means if the stick is provided as such means.

The present invention has been described in detail with respect to preferred embodiments, and it will now be obvious to those skilled in the art that changes and modifications may be made without departing from the invention in its broader aspects, and it is the intention, therefore, in the appended claims to cover all such changes and modifications as fall within the true spirit of the invention.

What is claimed is:

1. A cotton candy making machine, comprising:
   a rotary pot having a rotation axis associated with driving means, where a heater is included to heat sugar provided as a raw material and released the heated sugar in the form of floss-like threaded sugar from the rotary pot to the outside by rotating the rotary pot around the rotation axis by a rotary motion of the driving means;
   a basin to be rotated together with the rotary pot, in which the rotary pot is concentrically arranged;
   raw material supplying means for supplying the sugar into the rotary pot; and
   floss taking-up means that rotates around its rotation axis to take up floss-like threaded sugar released from the rotary pot,
   the floss taking-up means comprising:
      a stick onto which floss-like threaded sugar released from the rotary pot is wound; and
      at least one leaf spring provided around a peripheral surface of the stick,
      cotton candy detaching means for taking the floss-like threaded sugar out of the stick; and
      container-supplying means for supplying a predetermined container into which the detached floss-like threaded sugar is provided as a cotton candy.

2. A cotton candy making machine as claimed in claim 1, wherein
   the floss taking-up means comprises:
      a stick made of paper onto which floss-like threaded sugar released from the rotary pot is wound; and
      a stick holding means for holding the stick, which is able to rotate around an axis thereof for twirling the floss-like threaded sugar onto the stick.

3. A cotton candy making machine as claimed in claim 1, wherein the cotton candy detaching means comprises:
   an extruding means having an opening through which a floss taking-up stick is passed, where
   the extruding means is able to move in the direction along a rotation axis of the floss taking-up stick, and the leaf spring is pressed toward the rotation axis of the floss taking-up stick by the opening of the extruding means as the extruding means is moved.

4. A cotton candy making machine as claimed in claim 1, further comprising:
   a sheet of removable soil-preventing paper that covers both the bottom and the inner peripheral surface of the basin; and a fixing means for holding down the soil-preventing paper on the basin.

5. A cotton candy making machine as claimed in claim 1, wherein the basin is at least constructed of:
   a framework;
   a sheet of removable soil-preventing paper to be provided as at least an inner peripheral surface of the basin; and
   a fixing means for fixing the soil-preventing paper on the framework.

6. A cotton candy making machine as claimed in claim 1, wherein the raw material supplying means is constructed of a plurality of hoppers communicated with the rotary pot through metering distributors.

7. A cotton candy making machine as claimed in claim 3, wherein a plurality of cotton candy leaf springs are arranged on the tip of the floss taking-up stick so as to be radially opened in the direction of the radius of the floss taking-up stick, where the leaf springs are radially opened in the radial direction when the extruding means is positioned on the side of the rear end of the floss taking-up stick, while the leaf springs are converged as the extruding means moves to the tip of the floss taking-up stick.

8. The cotton candy making machine as claimed in claim 1, wherein the floss taking-up means comprises raw material supplying means containing a predetermined amount of the sugar, charges the sugar into the rotary pot by opening one end thereof.

9. A cotton candy making machine, comprising:

a rotary pot having a rotation axis associated with driving means, where a heater is included to heat sugar provided as a raw material and released the heated sugar in the form of floss-like threaded sugar from the rotary pot to the outside by rotating the rotary pot around the rotation axis by a rotary motion of the driving means;

a basin to be rotated together with the rotary pot, in which the rotary pot is concentrically arranged; and floss taking-up means, serving as raw material supplying means in which a predetermined amount of the sugar is contained, for charging the sugar into the rotary pot by opening one end thereof, and for rotating around its rotation axis to take up floss-like threaded sugar released from the rotary pot.

10. The cotton candy making machine as claimed in claim 9, wherein the floss taking-up means comprising:

a stick made up of paper in which the predetermined amount of sugar is contained, and onto which floss-like threaded sugar released from the rotary pot is wound; and stick holding means for holding the stick, which is able to rotate around an axis thereof for twirling the floss-like threaded sugar onto the stick.

11. A cotton candy making machine as claimed in claim 9, further comprising:

a sheet of removable soil-preventing paper that covers both the bottom and the inner peripheral surface of the basin; and fixing means for holding down the soil-preventing paper on the basin.

12. A cotton candy making machine as claimed in claim 9, wherein the basin is at least constructed of:

a framework;

a sheet of removable soil-preventing paper to be provided as at least an inner peripheral surface of the basin; and a fixing means for fixing the soil-preventing paper on the framework.

* * * * *

UNITED STATES PATENT AND TRADEMARK OFFICE
CERTIFICATE OF CORRECTION

PATENT NO. : 6,612,823 B2 Page 1 of 1
DATED : September 2, 2003
INVENTOR(S) : Takanori Bandou and Koichiro Handa It is certified that error appears in the above-identified patent and that said Letters Patent is hereby corrected as shown below:

<u>Title page,</u>
Item [73], Inventor, change, "Nokkaido" to -- Hokkaido --

Signed and Sealed this

Eighth Day of June, 2004

JON W. DUDAS
*Acting Director of the United States Patent and Trademark Office*